(12) United States Patent
Takasu et al.

(10) Patent No.: US 11,628,490 B2
(45) Date of Patent: Apr. 18, 2023

(54) MOLD MOLDING APPARATUS AND METHOD FOR CONTROLLING MOLD MOLDING APPARATUS

(71) Applicant: SINTOKOGIO, LTD., Nagoya (JP)

(72) Inventors: Shuji Takasu, Toyokawa (JP); Takehiro Sugino, Toyokawa (JP)

(73) Assignee: SINTOKOGIO, LTD., Nagoya (JP)

( * ) Notice: Subject to any disclaimer, the term of this patent is extended or adjusted under 35 U.S.C. 154(b) by 0 days.

(21) Appl. No.: 17/050,126

(22) PCT Filed: Apr. 25, 2019

(86) PCT No.: PCT/JP2019/017598
§ 371 (c)(1),
(2) Date: Oct. 23, 2020

(87) PCT Pub. No.: WO2019/239733
PCT Pub. Date: Dec. 19, 2019

(65) Prior Publication Data
US 2021/0229165 A1 Jul. 29, 2021

(30) Foreign Application Priority Data
Jun. 15, 2018 (JP) .............................. JP2018-114247

(51) Int. Cl.
*B22C 19/04* (2006.01)
*B22C 11/04* (2006.01)

(52) U.S. Cl.
CPC .............. *B22C 19/04* (2013.01); *B22C 11/04* (2013.01)

(58) Field of Classification Search
CPC ................................ B22C 19/04; B22C 11/04
See application file for complete search history.

(56) References Cited

U.S. PATENT DOCUMENTS

| 134,663 A | 1/1873 | Harper |
| 2,448,827 A | 9/1948 | Reder, Jr. |
| 3,004,311 A | 10/1961 | Snoeyenbos |
| 3,302,255 A | 2/1967 | Wagner, Jr. |
| 4,541,476 A | 9/1985 | Larsen |
| 4,878,534 A | 11/1989 | Weimann |

(Continued)

FOREIGN PATENT DOCUMENTS

| CN | 1349941 A | 5/2002 |
| CN | 101868310 A | 10/2010 |

(Continued)

OTHER PUBLICATIONS

English machine translation of JPS4937888B1 (Year: 1974).*

(Continued)

*Primary Examiner* — Kevin P Kerns
*Assistant Examiner* — Steven S Ha
(74) *Attorney, Agent, or Firm* — Oliff PLC

(57) ABSTRACT

A mold molding apparatus can successively mold casting molds having the necessary casting mold strength, and a method for controlling the mold molding apparatus. A molding sensor measures a pressure of molding sand exerted on a surface of one or both of a pattern plate and a squeeze foot, or on a surface of one or both of a pattern plate and a squeeze board; and a control device that controls operation of the mold molding apparatus based on outputs from the molding sensors.

22 Claims, 14 Drawing Sheets

(56) References Cited

U.S. PATENT DOCUMENTS

| | | | |
|---|---|---|---|
| 5,558,148 | A | 9/1996 | Uzaki et al. |
| 6,390,178 | B1 * | 5/2002 | Makino .................. B22C 19/04 164/4.1 |
| 6,470,953 | B1 | 10/2002 | Hirata et al. |
| 6,957,687 | B2 | 10/2005 | Hirata et al. |
| 7,191,818 | B2 | 3/2007 | Hirata et al. |
| 7,341,095 | B2 | 3/2008 | Hirata et al. |
| 8,616,263 | B2 | 12/2013 | Hadano et al. |
| 2002/0129917 | A1 | 9/2002 | Kaneto et al. |
| 2002/0157802 | A1 | 10/2002 | Amano et al. |
| 2004/0129404 | A1 | 7/2004 | Amano et al. |
| 2004/0206472 | A1 | 10/2004 | Hirata et al. |
| 2005/0279482 | A1 | 12/2005 | Hirata et al. |
| 2005/0279483 | A1 | 12/2005 | Hirata et al. |
| 2006/0037730 | A1 | 2/2006 | Hirata et al. |
| 2006/0037731 | A1 | 2/2006 | Hirata et al. |
| 2008/0093044 | A1 | 4/2008 | Hirata et al. |
| 2010/0276528 | A1 | 11/2010 | Aoki et al. |
| 2015/0144289 | A1 | 5/2015 | Kato et al. |
| 2015/0197044 | A1 | 7/2015 | Kato et al. |
| 2018/0133719 | A1 | 5/2018 | Oba et al. |
| 2019/0193144 | A1 | 6/2019 | Iburg |

FOREIGN PATENT DOCUMENTS

| | | |
|---|---|---|
| CN | 104334296 A | 2/2015 |
| CN | 205393449 U | 7/2016 |
| CN | 206194914 U | 5/2017 |
| CN | 107297470 A | 10/2017 |
| CN | 107321933 A | 11/2017 |
| CN | 107635693 A | 1/2018 |
| DE | DD202113 A5 | 8/1983 |
| EP | 0122116 A2 | 10/1984 |
| EP | 1433548 A1 | 6/2004 |
| EP | 2604362 A2 | 6/2013 |
| JP | S49-037888 B1 | 10/1974 |
| JP | S60-115346 A | 6/1985 |
| JP | S61-092439 U | 6/1986 |
| JP | S62-174247 U | 11/1987 |
| JP | H01-289536 A | 11/1989 |
| JP | H04-158949 A | 6/1992 |
| JP | H07-232235 A | 9/1995 |
| JP | 2000-117394 A | 4/2000 |
| JP | 2001-038451 A | 2/2001 |
| JP | 2001-198651 A | 7/2001 |
| JP | 2001-293540 A | 10/2001 |
| JP | 2002-028754 A | 1/2002 |
| JP | 2002-263793 A | 9/2002 |
| JP | 3415497 B2 | 6/2003 |
| JP | 3729197 B2 | 12/2005 |
| WO | 03/013762 A1 | 2/2003 |
| WO | 2011/070814 A1 | 6/2011 |
| WO | 2016/103992 A1 | 6/2016 |
| WO | 2016/203394 A1 | 12/2016 |

OTHER PUBLICATIONS

Jul. 23, 2021 Office Action issued in U.S. Appl. No. 16/965,213.
Jul. 23, 2021 Office Action issued in U.S. Appl. No. 17/046,144.
Jul. 30, 2019 International Search Report issued in International Patent Application No. PCT/JP2019/017600.
Jun. 4, 2019 International Search Report issued in International Patent Application No. PCT/JP2019/017577.
Jul. 30, 2019 International Search Report issued in International Patent Application No. PCT/JP2019/017598.
Jul. 30, 2019 International Search Report issued in International Patent Application No. PCT/JP2019/017599.
Jun. 4, 2019 International Search Report issued in International Patent Application No. PCT/JP2019/017576.
U.S. Appl. No. 16/965,213, filed Jul. 27, 2020 in the name of Ishii et al.
U.S. Appl. No. 17/046,144, filed Oct. 8, 2020 in the name of Ishii et al.
U.S. Appl. No. 17/042,231, filed Sep. 28, 2020 in the name of Ishii et al.
U.S. Appl. No. 16/962,536, filed Jul. 16, 2020 in the name of Ishii et al.
Mar. 22, 2021 Office Action issued in U.S. Appl. No. 16/962,536.
Apr. 13, 2021 Office Action issued in U.S. Appl. No. 16/965,213.
May 26, 2021 Office Action issued in U.S. Appl. No. 17/042,231.
Nov. 9, 2021 Office Action issued in U.S. Appl. No. 17/046,144.
U.S. Appl. No. 17/518,114, filed Nov. 3, 2021 in the name of Ishii et al.
Sep. 9, 2021 Notice of Non-Compliant Amendment issued in U.S. Appl. No. 17/042,231.
Jul. 12, 2021 Notice of Non-Responsive Amendment issued in U.S. Appl. No. 16/962,536.
U.S. Appl. No. 17/471,938, filed Sep. 10, 2021 in the name of Takato Ishii et al.
Aug. 29, 2022 Office Action issued in U.S. Appl. No. 17/471,938.
Sep. 9, 2022 Office Action Issued In U.S. Appl. No. 17/518,114.
Dec. 9, 2022 Office Action issued in U.S. Appl. No. 17/471,938.
Dec. 20, 21322 Office Action issued in U.S. Appl. No. 17/518,114.
Feb. 23, 2023 Advisory Action issued in U.S. Appl. No. 17/471,938.

* cited by examiner

FIG. 4
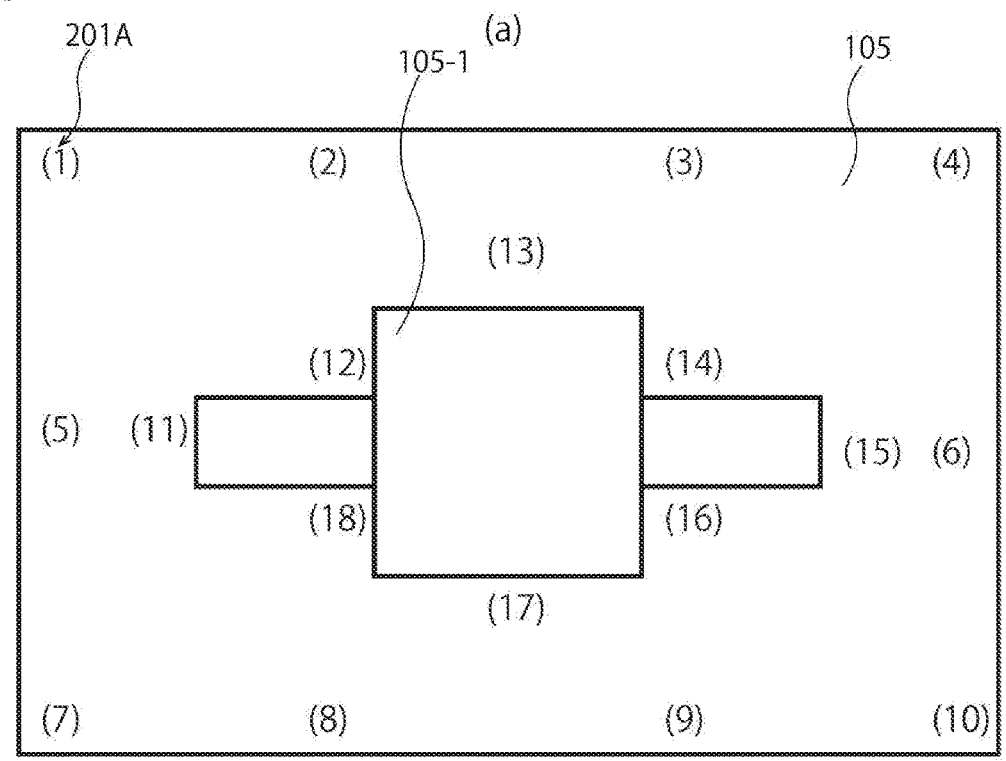
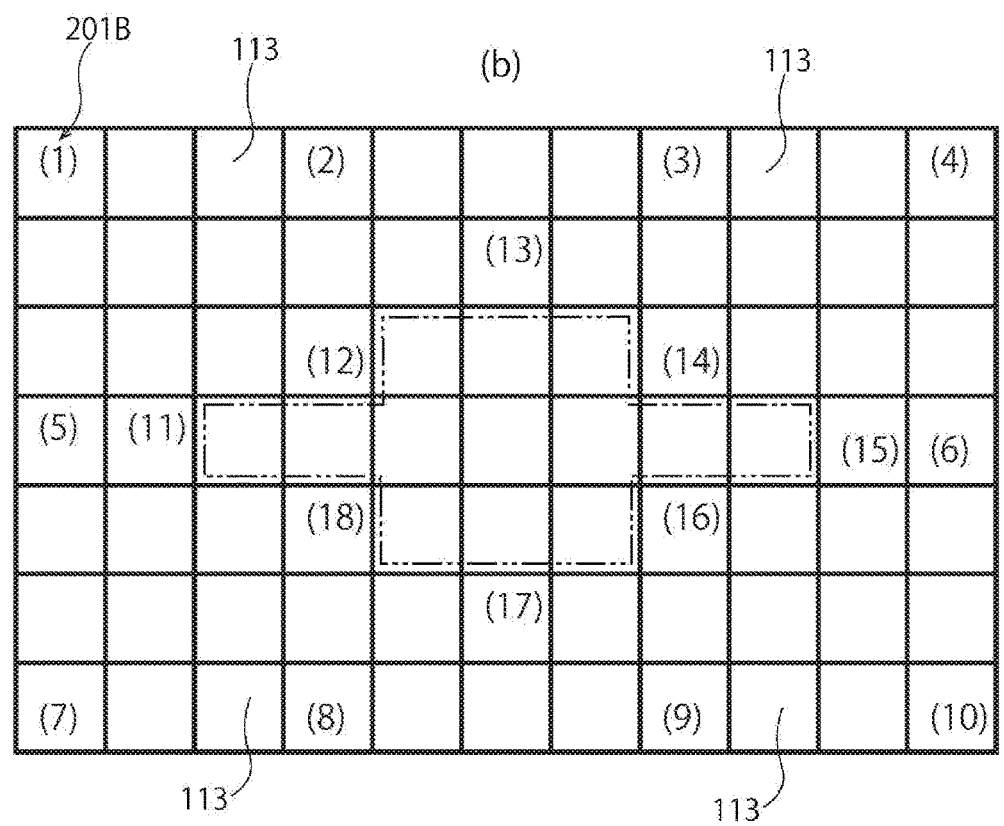

FIG. 8
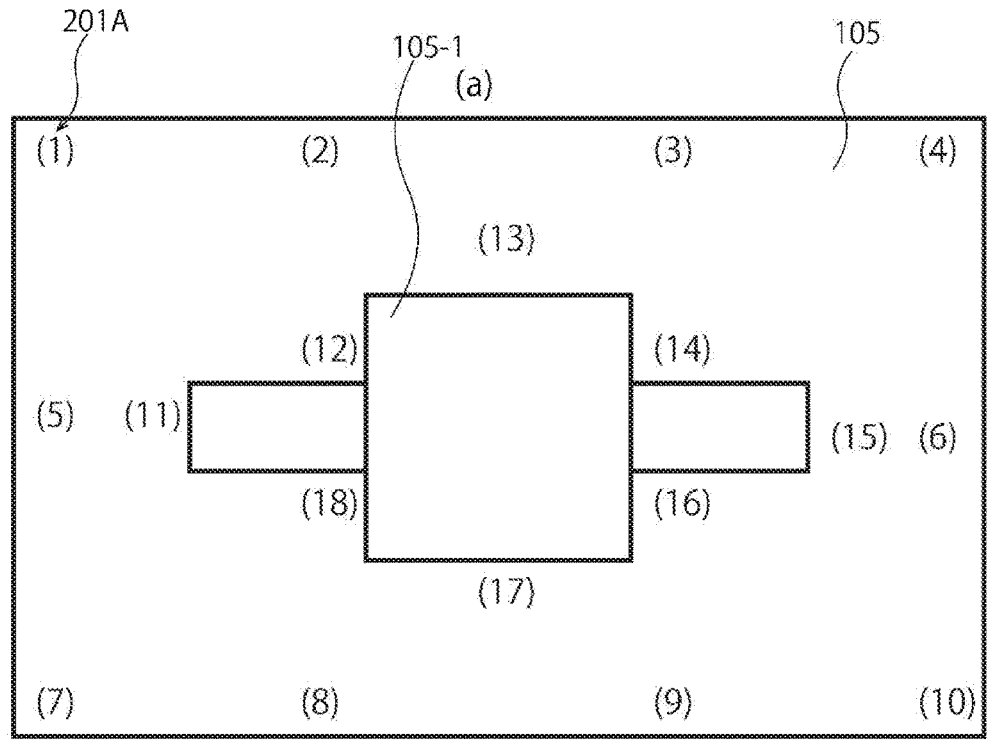
(a)
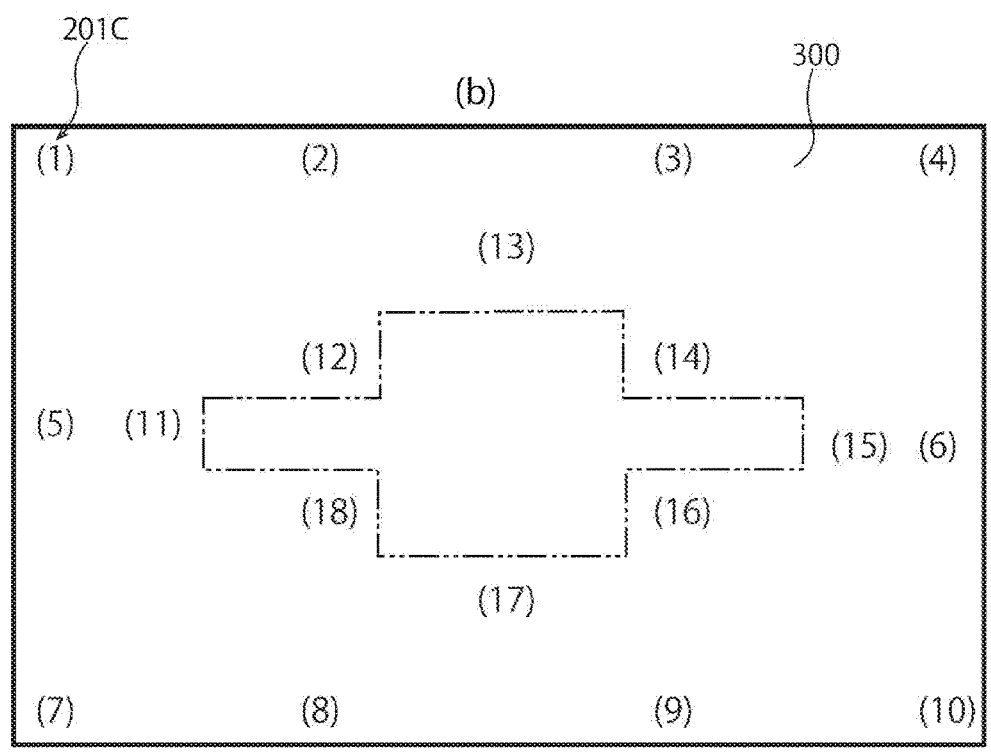
(b)

FIG. 9
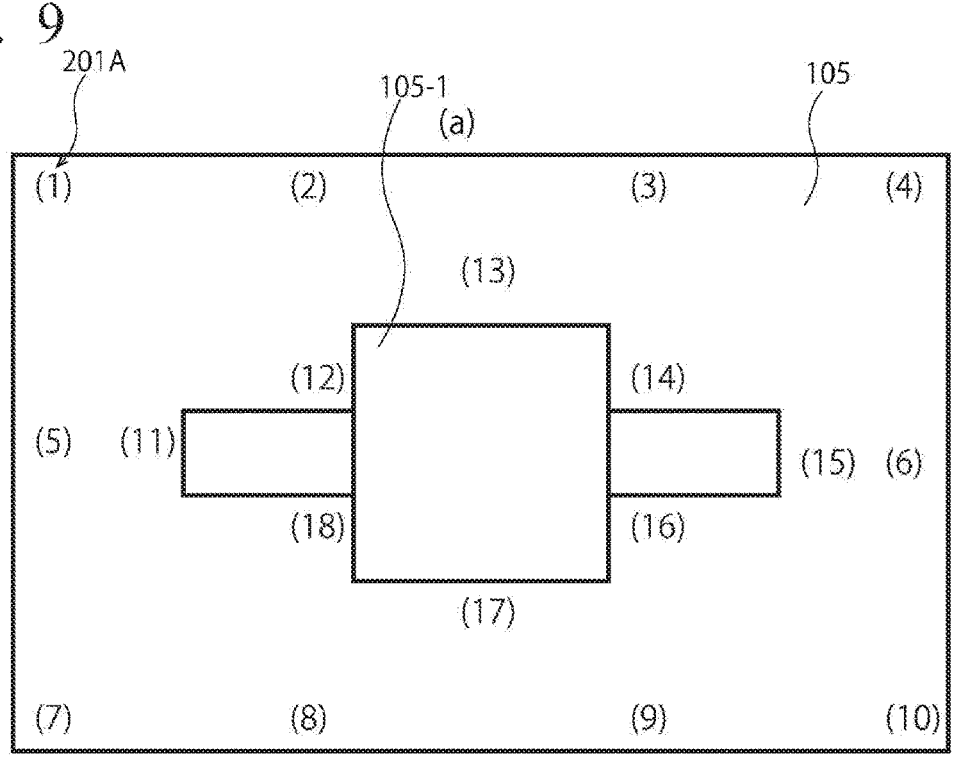
(a)
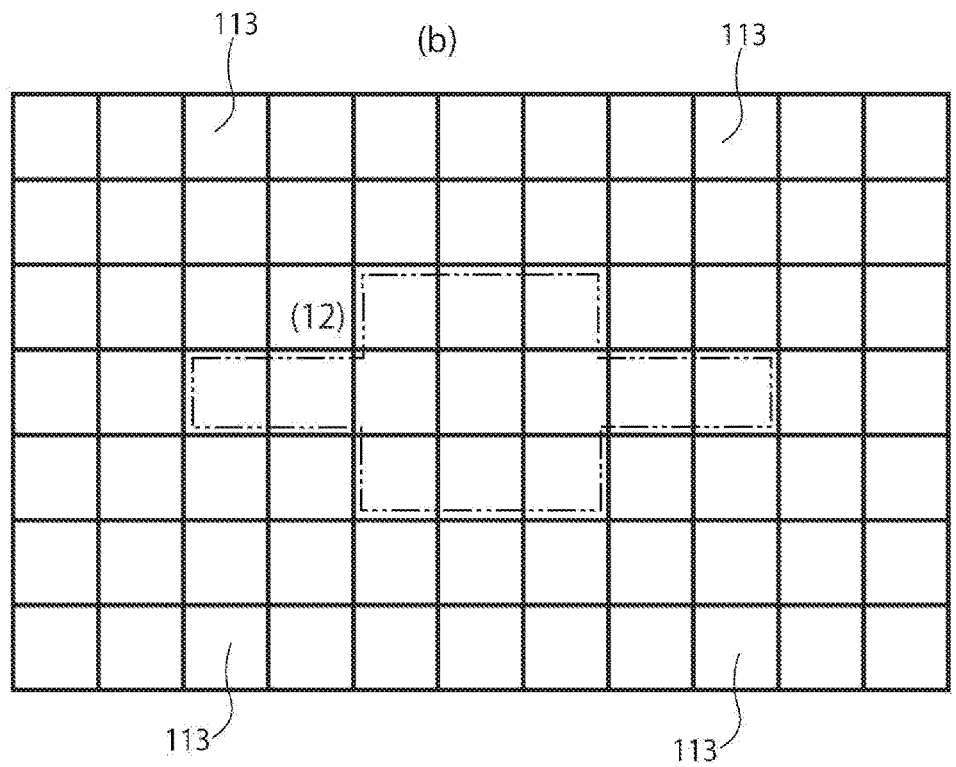
(b)

FIG. 10
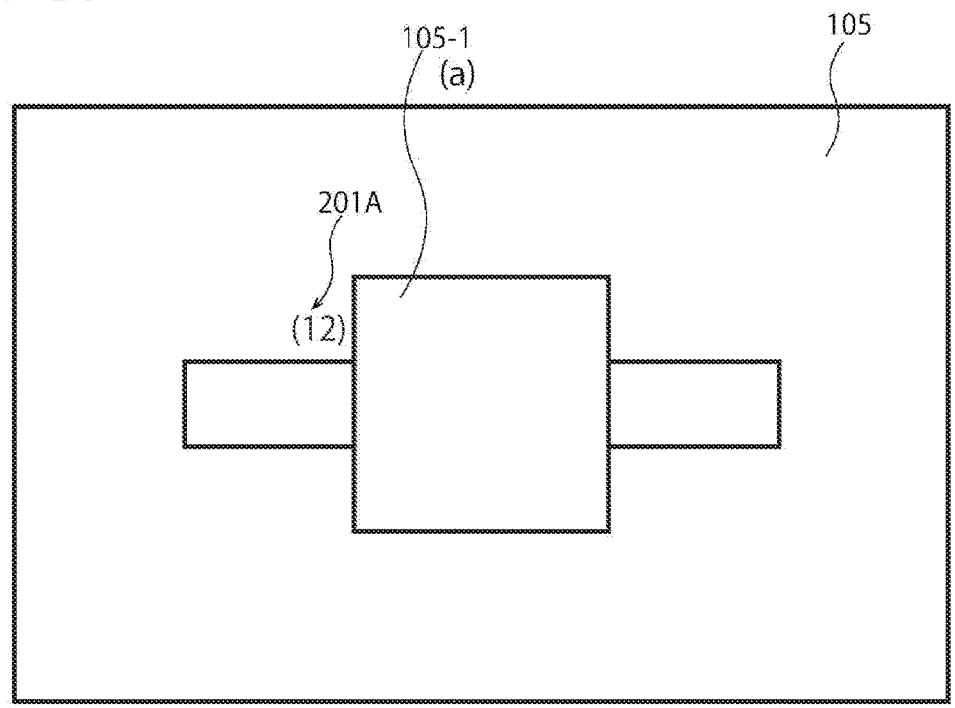
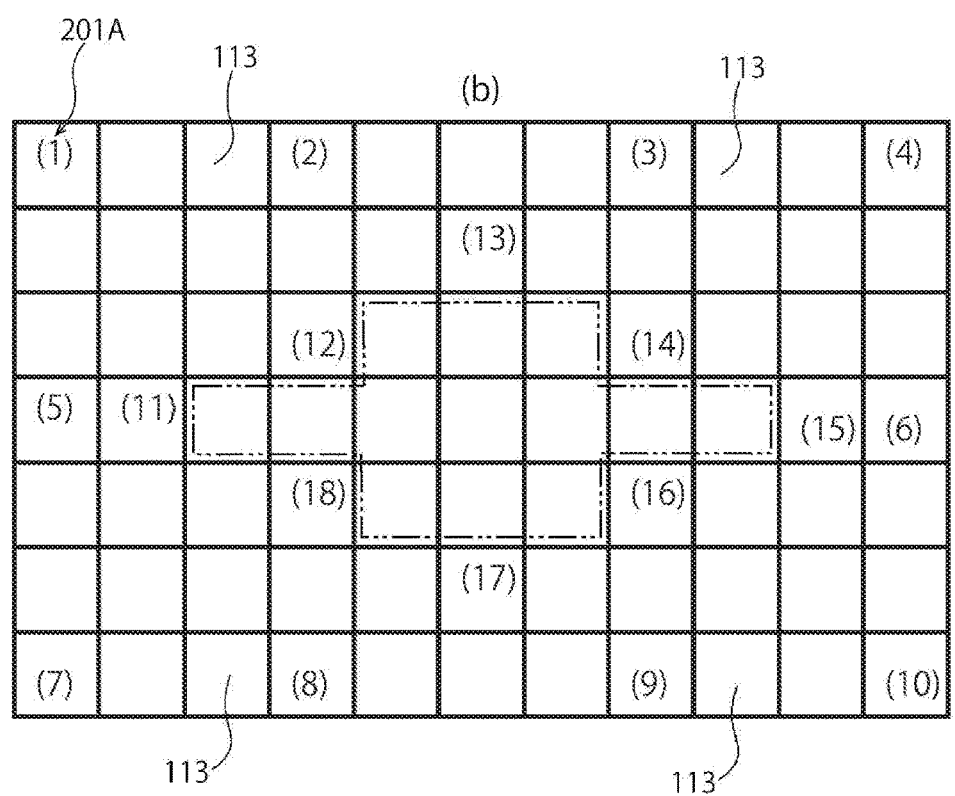

FIG. 11
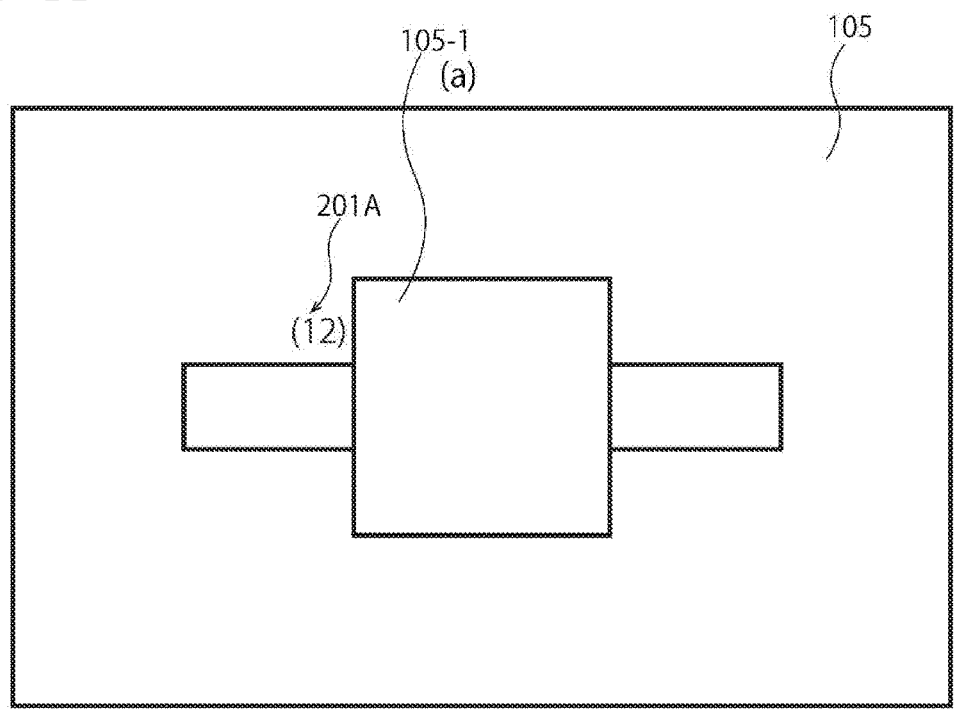
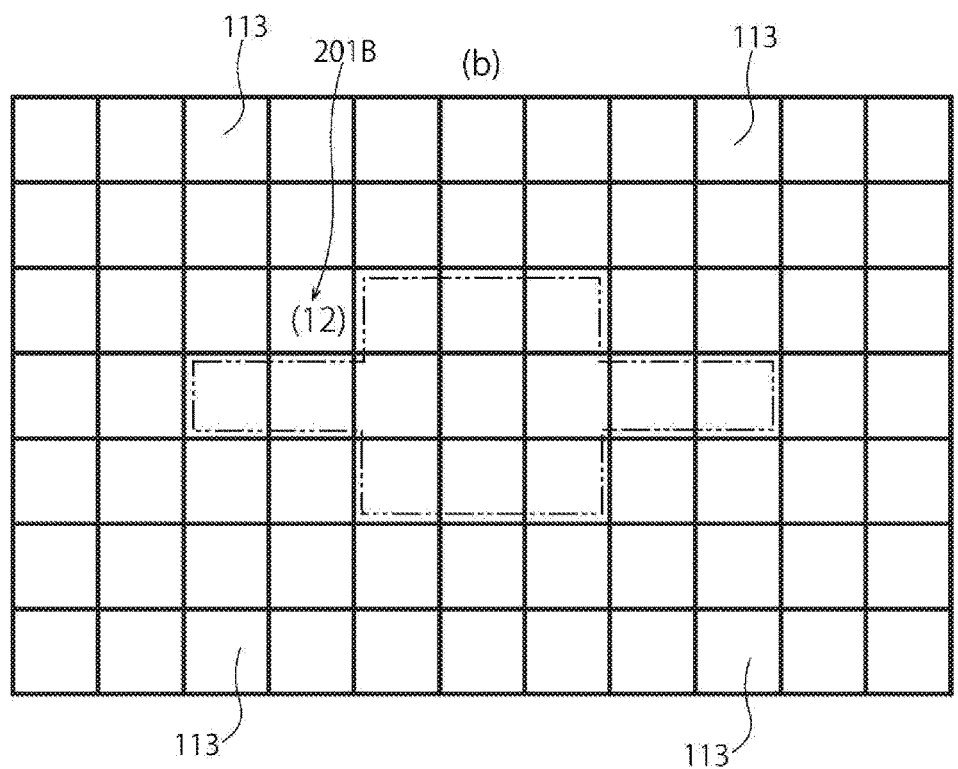

FIG. 12
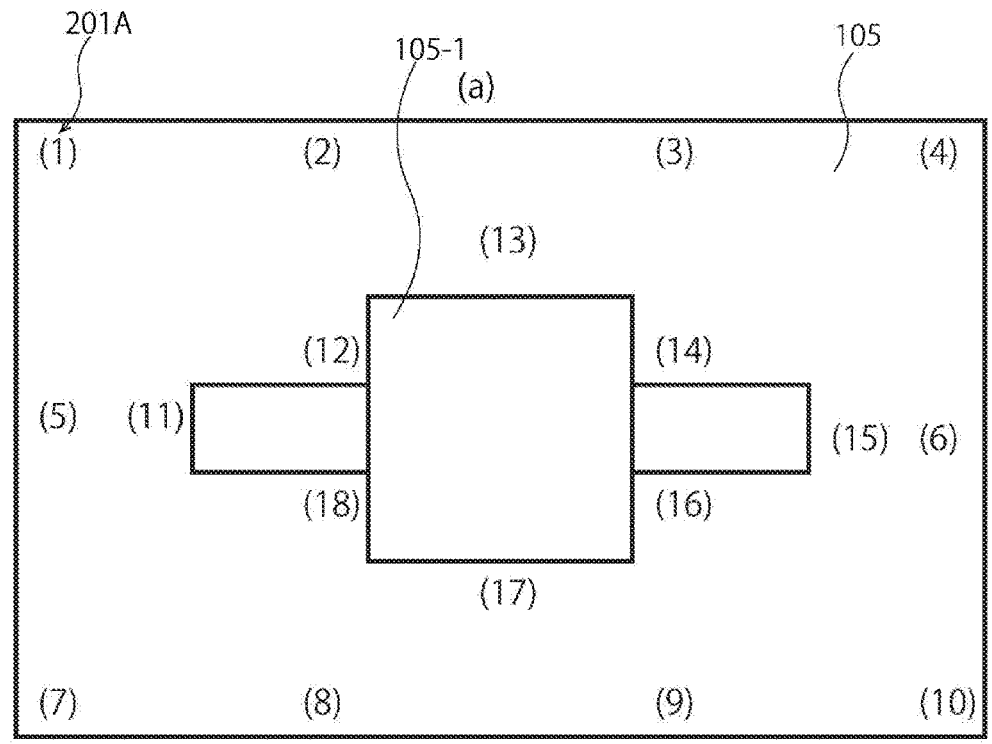
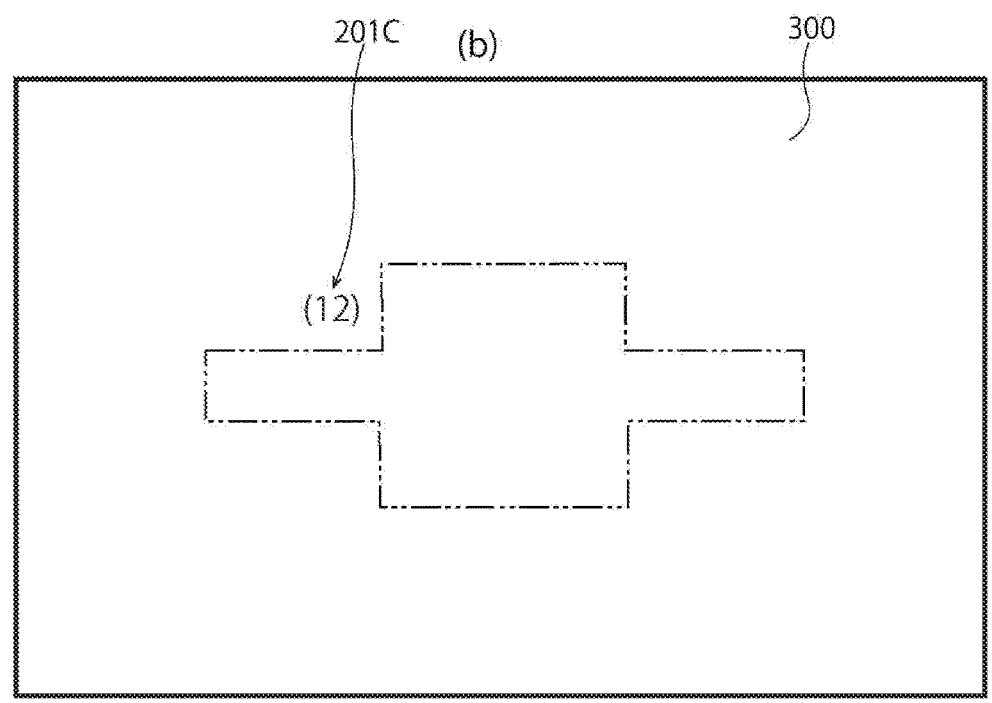

FIG. 13
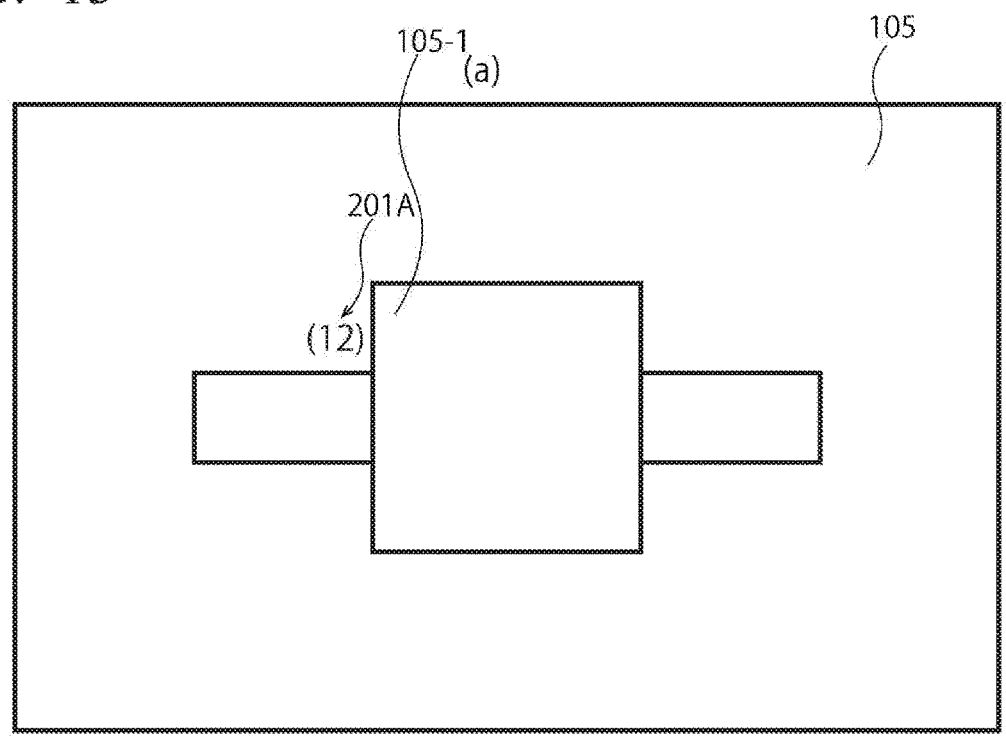
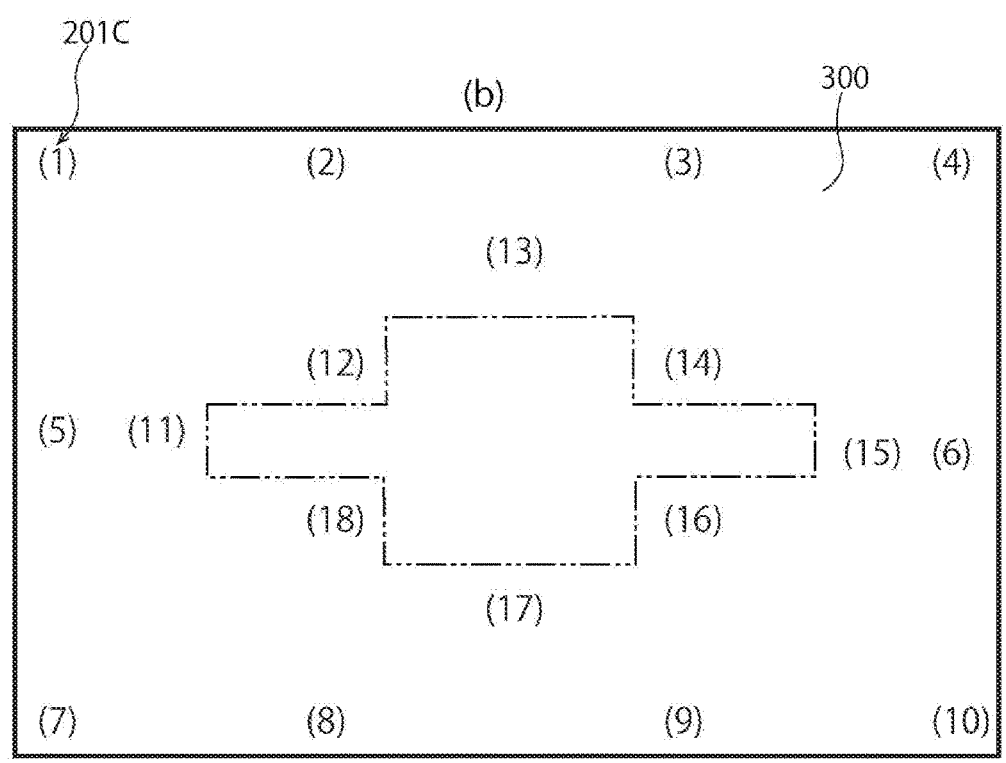

FIG. 14
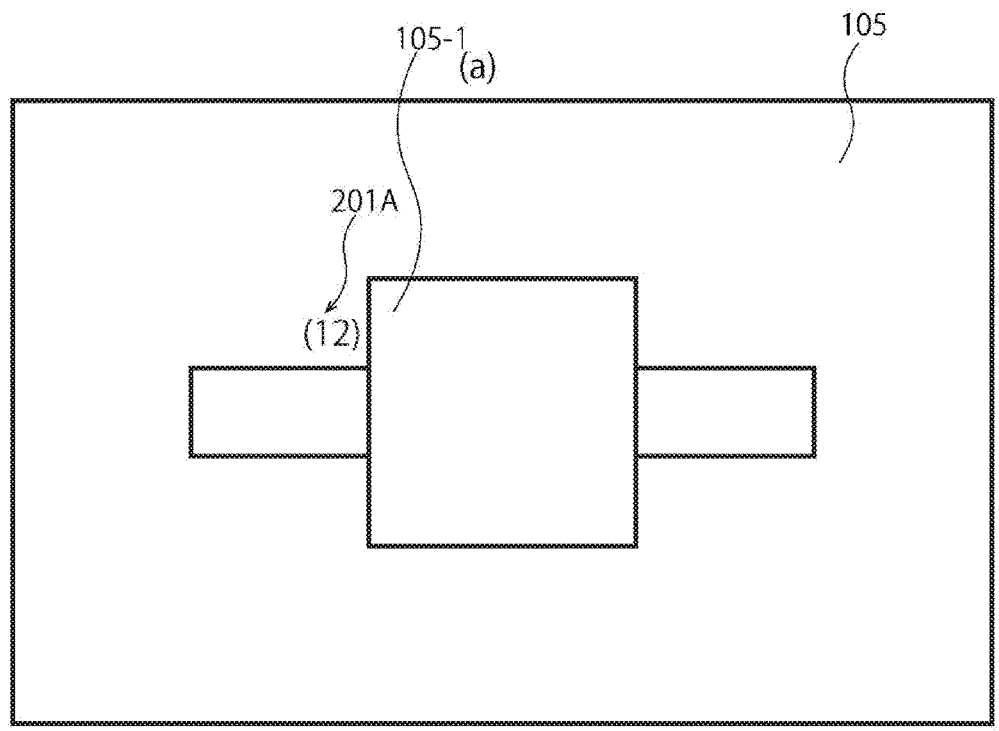
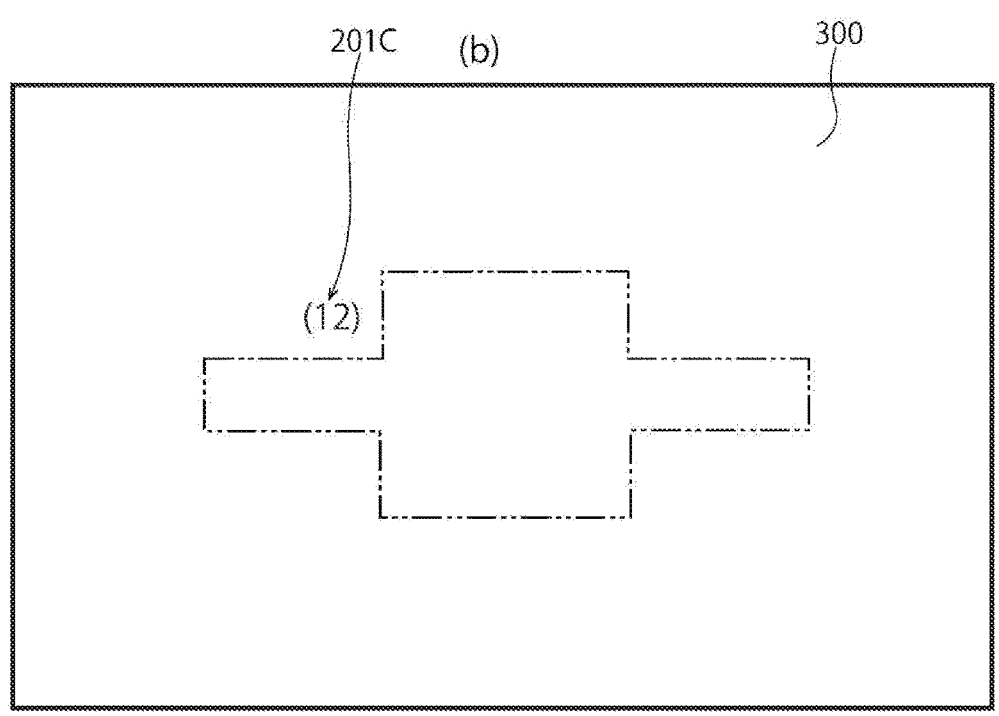

MOLD MOLDING APPARATUS AND METHOD FOR CONTROLLING MOLD MOLDING APPARATUS

TECHNICAL FIELD

The present invention relates to a mold molding apparatus used on a casting line, and a method for controlling the mold molding apparatus.

BACKGROUND

Generally, a casting procedure includes a sand treatment step, a mold molding step, a core installation step, a melt pouring step, a cooling/conveying step, and a post-treatment step. For performing these steps, a sand treatment apparatus, a mold molding apparatus, a core installation apparatus, a melt pouring apparatus, a cooling/conveying apparatus, and a post-treatment apparatus are respectively provided in the order of the steps.

The present invention is directed to a mold molding apparatus provided for the mold molding step.

The mold molding apparatus loads molding sand into a space that is delimited by a pattern plate and a casting frame, and compresses the molding sand to mold a casting mold.

The casting mold that has been molded must be compliant with various specifications, and must, in particular, be provided with a prescribed casting mold strength.

Conventionally, as an apparatus for measuring the strengths of casting molds that have been molded, an apparatus that uses force sensors to measure the strengths of casting molds that are consecutively discharged from a mold molding machine, and that determines whether or not the casting molds are acceptable by computing and comparing the measurement results with set strengths that have been preset is known, as disclosed in Patent Document 1.

Patent Document 2 discloses a mold molding machine that detects the pressure of molding sand exerted on the surface of a pattern plate in a mold molding machine while molding casting molds. With this apparatus, each time a casting mold is molded, the detected pressure of the molding sand is converted to the hardness of the casting mold, which is highly correlated therewith, and displayed.

CITATION LIST

Patent Literature

Patent Document 1: JP H7-232235 A
Patent Document 2: JP S61-92439 U

SUMMARY OF INVENTION

Technical Problem

However, with the apparatus in the above-mentioned Patent Document 1, the casting mold has already been molded by the time the casting mold strength is measured. Thus, although the acceptability determination performed at this time prevents defective products from being discharged in the next step, there is a problem in that it is not possible to make use of the results of the acceptability determination during the molding or for molding the casting mold in the next cycle.

Additionally, in the mold molding apparatus in the above-mentioned Patent Document 2, the casting mold hardness converted from the pressure of the molding sand exerted on the surface of the pattern plate can be known, so it is possible to determine whether a casting mold that has been molded is acceptable or defective. However, this is after the casting mold has been molded, and thus, as with the above-mentioned apparatus, there is a problem in that it is not possible to make use of the results of the acceptability determination during the molding or for molding the casting mold in the next cycle.

Accordingly, both of the above-mentioned apparatuses have the problem that it is difficult to successively mold casting molds having the necessary casting mold strength.

In order to solve the above-mentioned problem, an objective of the present invention is to provide a mold molding apparatus that can successively mold casting molds having the necessary casting mold strength, and a method for controlling the mold molding apparatus.

Solution to Problem

The present invention employs the features indicated below in order to solve the above-mentioned problem. Specifically, the present invention comprises: a molding sensor that measures a pressure of molding sand exerted on a surface of one or both of a pattern plate and a squeeze foot, or on a surface of one or both of a pattern plate and a squeeze board; and a control device that controls operation of a mold molding apparatus based on an output from the molding sensor.

According to the present invention, the pressure of molding sand is directly measured during molding and the operation of the mold molding apparatus is controlled based on the measurement values. Thus, casting molds with the necessary strength can be successively molded in a stable manner. Additionally, even if a defective casting mold is made due to insufficient strength or a strength disparity, countermeasures can be implemented immediately, in the next molding cycle.

In one embodiment of the present invention, the mold molding apparatus further comprises a strength computation unit that computes a casting mold strength based on an output from the molding sensor, wherein the operation of the mold molding apparatus is controlled based on an output from the strength computation unit.

In one embodiment of the present invention, a plurality of the molding sensors are provided on a surface of one or both of the pattern plate and the squeeze foot, or on a surface of one or both of the pattern plate and the squeeze board.

In this embodiment, the casting mold strength is computed from a plurality of molding sensors. Thus, the precision of the casting mold strength measurement can be improved.

In one embodiment of the present invention, the control device comprises a first control unit that controls a squeeze pressure based on the output from the molding sensor.

In this embodiment, the squeeze pressure is controlled, so casting molds having the necessary strength can be stably and successively molded. In this case, changes in the squeeze pressure control and the like can be quickly applied in real time and in the next cycle.

In one embodiment of the present invention, the control device comprises a second control unit that controls an aeration pressure based on the output from the molding sensor.

In this embodiment, the aeration pressure is controlled. Thus, casting molds having the necessary strength can be stably and successively molded. In this case, changes in the aeration pressure control and the like can be quickly applied in real time and in the next cycle.

In one embodiment of the present invention, the control device comprises a third control unit that controls an aeration time based on the output from the molding sensor.

In this embodiment, the aeration time is controlled. Thus, casting molds having the necessary strength can be stably and successively molded. In this case, changes in the aeration time control and the like can be quickly applied in real time and in the next cycle.

In one embodiment of the present invention, the control device comprises a fourth control unit that controls a setting position of the squeeze foot or the squeeze board based on the output from the molding sensor.

In this embodiment, the setting position of the squeeze foot or the squeeze board is controlled. Thus, casting molds having the necessary strength can be stably and successively molded. In this case, changes in the setting position control can be quickly applied in real time and in the next cycle.

In one embodiment of the present invention, the control device comprises a fifth control unit that controls a leveling frame based on the output from the molding sensor.

In this embodiment, the leveling frame is controlled. Thus, casting molds having the necessary strength can be stably and successively molded. In this case, changes in the leveling frame control can be quickly applied in real time and in the next cycle.

In one embodiment of the present invention, the control device comprises a sixth control unit that controls the squeeze foot based on the output from the molding sensor.

In this embodiment, the squeeze foot is controlled. Thus, casting molds having the necessary strength can be stably and successively molded. In this case, changes in the squeeze foot control can be quickly applied in real time and in the next cycle.

In one embodiment of the present invention, the molding sensor is selected in accordance with a shape of a product portion of the pattern plate.

In this embodiment, the optimal molding sensor for casting mold strength measurement can be selected in accordance with the shape of the product portion. Thus, the precision of the casting mold strength measurements can be improved.

In one embodiment of the present invention, the mold molding apparatus comprises a display device that, if the output from the molding sensor is not at least a necessary output value, displays a cause due to which the necessary output is not obtained and a countermeasure therefor.

In this embodiment, a worker can be immediately notified if a casting mold defect occurs. Thus, countermeasures against casting mold defects can be implemented on the mold molding apparatus in a timely manner, without continuing to mold defective casting molds.

In one embodiment of the present invention, the mold molding apparatus comprises a display device that, if the outputs from the molding sensors have a disparity of a predetermined value or larger, displays a warning regarding clogging of an aeration nozzle, clogging of an aeration filter, or clumping of sand in a molding sand hopper, instead of the control device controlling the mold molding apparatus.

In this embodiment, when a casting mold defect occurs, a worker can be immediately notified of the cause thereof. Thus, the mold molding apparatus can be quickly inspected.

Additionally, the present invention is a method for controlling a mold molding apparatus wherein the method involves: measuring a pressure of molding sand exerted on a surface of one or both of a pattern plate and a squeeze foot, or on a surface of one or both of a pattern plate and a squeeze board; and controlling operation of the mold molding apparatus based on the measurement results.

According to the present invention, as described above, the pressure of the molding sand is directly measured during molding and the operation of the mold molding apparatus is controlled based on the measurement values. Thus, casting molds with the necessary strength can be successively molded in a stable manner. Additionally, even if a casting mold defect occurs due to insufficient strength or a strength disparity, countermeasures can be implemented immediately, in the next molding cycle.

In one embodiment of the present invention, the method further involves computing a casting mold strength based on the pressure, and the operation of the mold molding apparatus is controlled based on the casting mold strength.

Effects of Invention

According to the present invention, a mold molding apparatus is controlled based on the pressure of molding sand while molding a casting mold, or a casting mold strength computed from said pressure. Thus, casting molds having the necessary casting mold strength can be successively molded.

BRIEF DESCRIPTION OF DRAWINGS

FIG. 4 is a diagram showing the mounting positions of sensors on a pattern plate (a) and squeeze feet (b), wherein (a) is a plan view and (b) is a section view along the line P1-P1 in FIG. 2.

FIG. 8 is a diagram showing the mounting positions of sensors on a pattern plate (a) and a squeeze board (b), wherein (a) is a plan view and (b) is a section view along the line P2-P2 in FIG. 7.

FIG. 9 is a diagram showing the mounting positions of sensors on a pattern plate (a) and squeeze feet (b), wherein (a) is a plan view and (b) is a section view along the line P1-P1 in FIG. 2.

FIG. 10 is a diagram showing the mounting positions of sensors on a pattern plate (a) and squeeze feet (b), wherein (a) is a plan view and (b) is a section view along the line P1-P1 in FIG. 2.

FIG. 11 is a diagram showing the mounting positions of sensors on a pattern plate (a) and squeeze feet (b), wherein (a) is a plan view and (b) is a section view along the line P1-P1 in FIG. 2.

FIG. 12 is a diagram showing the mounting positions of sensors on a pattern plate (a) and a squeeze board (b), wherein (a) is a plan view and (b) is a section view along the line P2-P2 in FIG. 7.

FIG. 13 is a diagram showing the mounting positions of sensors on a pattern plate (a) and a squeeze board (b), wherein (a) is a plan view and (b) is a section view along the line P2-P2 in FIG. 7.

FIG. 14 is a diagram showing the mounting positions of sensors on a pattern plate (a) and a squeeze board (b), wherein (a) is a plan view and (b) is a section view along the line P2-P2 in FIG. 7.

DESCRIPTION OF EMBODIMENTS

Figure 1:
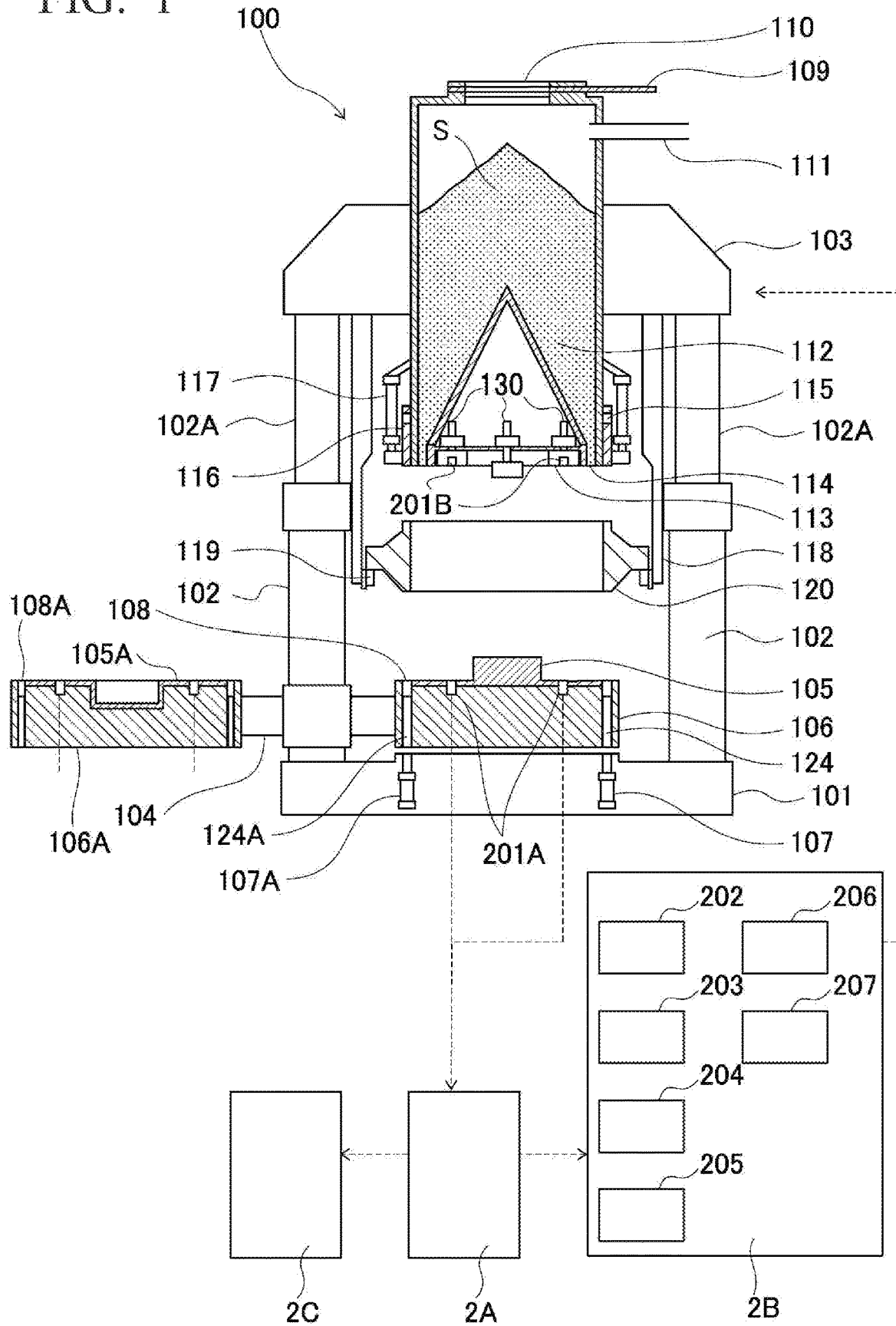
FIG. 1 is a vertical section view of a mold molding apparatus according to a first embodiment of the present invention.

Hereinafter, embodiments of the present invention will be explained in detail by referring to the drawings.

First Embodiment

FIG. 1 is a vertical section view of a mold molding apparatus 100 according to the present invention. In this drawing, frame setting cylinders 102, 102 are installed so as stand on both the left and right sides above a molding base 101, and a raising/lowering support frame 103 is arranged to span the tips of piston rods 102A, 102B of the frame setting cylinders 102, 102. In other words, the frame setting cylinders 102, 102 stand upright with the retracted ends towards the molding base 101.

Below one (the left side in FIG. 1) of the frame setting cylinders 102, 102, a central portion of a pattern exchange apparatus 104 is supported so as to be able to rotate in the horizontal plane. On both ends of the pattern exchange apparatus 104, pattern carriers 106, 106A, on which pattern plates 105, 105A (upper and lower pattern plates) are placed, are set in a state such that they are lifted up by approximately 5 mm by means of springs (not illustrated). The pattern plates 105, 105A are conveyed, in alternating fashion, into and out of an area above the center of the molding base 101.

Under positions on the outer sides of the four corners of the pattern plates 105, 105A on the pattern carriers 106, 106A, releasing/lifting cylinders 107, 107A are embedded, facing upwards, inside the molding base 101. The tips thereof are able to press against pins 124, 124A in the pattern carriers 106, 106A. Additionally, frame-shaped leveling frames 108, 108A that surround the outer perimeters of the pattern plates 105, 105A and that slide up and down are supported thereon. The leveling frames 108, 108A are configured so as to protrude slightly above (see FIG. 2) parting planes of the pattern plates 105, 105A at the extended ends of the releasing/lifting cylinders 107, 107A, and to be substantially flush (see FIG. 3) with the parting planes of the pattern plates 105, 105A at the retracted ends. Additionally, the releasing/lifting cylinders 107, 107A have enough power to lift a leveling frame 108 and a casting frame 120 serving as a frame member and containing a casting mold, thereby releasing the mold. However, this power is not sufficient to raise the frame setting cylinders 102, 102. Furthermore, the pattern carrier 106 is provided with a clamp member (not illustrated), and the molding base 101 is provided with a clamp apparatus (not illustrated) for clamping the clamp member. The pattern carrier 106 is pressed against molding base 101 by the clamp apparatus pulling and clamping the clamp member.

Suspended from the raising/lowering support frame 103 is a sand hopper 112 having, at an upper end thereof, a sand loading inlet 110 that is opened and closed by means of a sliding gate 109, and having an air supply tube 111 connected to an upper side portion thereof for introducing low-pressure air through a on/off valve (not illustrated). Multiple air ejection chambers (not illustrated) that are connected to a compressed air source (not illustrated) through a single on/off valve (not illustrated) are provided on the lower peripheral sides and the lower inner portion. The multiple air ejection chambers are configured to provide aeration by ejecting low-pressure air into the sand hopper 112, thereby suspending and fluidizing the molding sand S. Furthermore, on the lower end of the sand hopper 112 are provided segmented squeeze feet 113, 113, which serve as squeezing means, and sand-loading nozzles 114, 114 surrounding the squeeze feet 113, 113.

The segmented squeeze feet 113, 113 are moved up and down by means of segment cylinders.

As systems for controlling squeeze feet, there are segmented systems and preset systems. Segmented systems are systems in which the squeeze feet can be controlled while being raised or lowered during a squeezing operation. Preset systems are systems in which the squeeze feet can only be controlled while being raised during a squeezing operation. In both types of systems, before the squeezing operation (before loading the sand), the squeeze feet, which face a model, are vertically positioned in accordance with height of the model, and moved during the squeezing operation, thereby adjusting the height of the molding sand S when loading the sand, thereby making the sand compression rate uniform and making the casting mold compression strength even. Either system may be chosen in accordance with the casting mold or at the discretion of the manufacturer. Generally, when segmented squeeze feet are used, the casting mold strength rises in the portions in which they are used. Conversely, when preset squeeze feet are used, the casting mold strength becomes lower in the portions in which they are used.

Additionally, a filling frame 116 that surrounds the outsides of the set of segmented squeeze feet 113, 113 and sand-loading nozzles 114, 114 so as to be able to move up and down, and that has vent holes 115, 115 communicating with an evacuation control chamber (not illustrated) in an upper portion thereof is arranged so as to be coupled to filling frame cylinders 117, 117 that are provided, facing downward, on lower side portions of the sand hopper 112. Furthermore, on the raising/lowering support frame 103, at positions to the left and right outer sides of the sand hopper 112, a carry-in/carry-out conveyor 119 for carrying casting frames 120 is suspended from frames 118, 118 that extend to positions lower than the segmented squeeze feet 113, 113.

Figure 2:
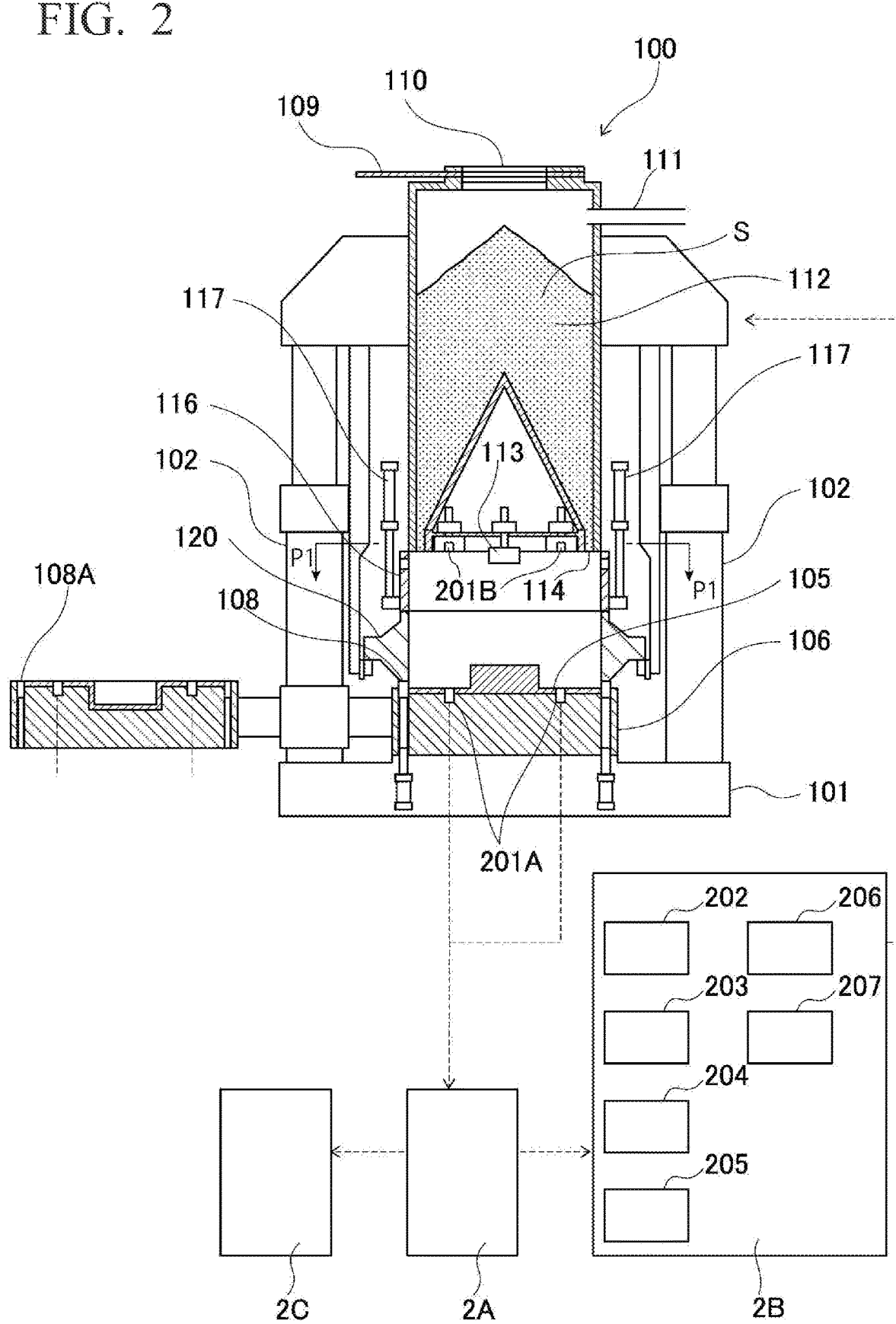
FIG. 2 is a vertical section view showing the above-mentioned first embodiment in a state in which the mold molding space has been delimited.
Figure 3:
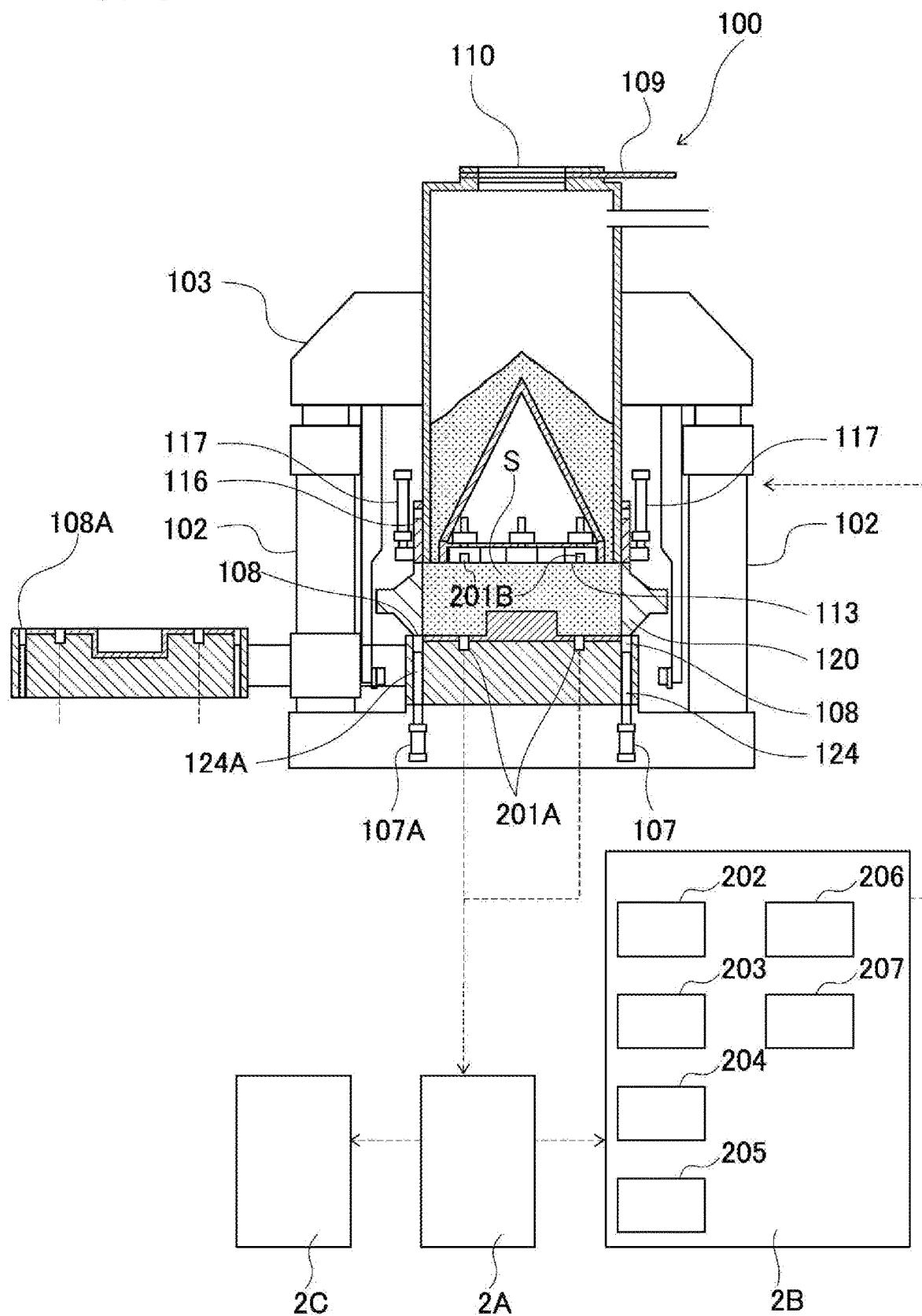
FIG. 3 is a vertical section view showing the above-mentioned first embodiment in a molding sand squeezed state after the molding sand has been loaded.

As illustrated in FIG. 1, on the surfaces of the pattern plate 105 and the squeeze feet 113, 113, . . . with which the molding sand S comes into contact, molding sensors 201A, 201B are provided for measuring the pressure exerted by the molding sand S on these surfaces. The sensors 201A, 201B in FIGS. 1 to 3 are illustrated as schematic conceptual drawings, and the actual arrangements of the sensors are illustrated in FIG. 4. FIG. 4(a) illustrates the details of the molding sensors 201A provided in the pattern plate 105. FIG. 4(b) is a section view along the line P1-P1 in FIG. 2, and this drawing illustrates the details of the molding sensors 201B provided in the squeeze feet 113, 113, . . . .

As illustrated in FIG. 4(a), the molding sensors 201A comprise sensors (1) to (10) that are arranged along the outer periphery of the pattern plate 105, and sensors (11) to (18) that are arranged around the perimeter of the model (product portion) 105-1. Additionally, on the squeeze feet 113, 113, . . . located above the pattern plate 105, eighteen sensors are provided so as to respectively face the sensors (1) to (18) provided on the pattern plate 105, as illustrated in FIG. 4(b).

The outputs of the sensors (1) to (18) in the pattern plate 105 and the squeeze feet 113, 113, . . . are sent to a strength computation unit 2A illustrated in FIG. 1, the outputs from the sensors (1) to (10) as the outputs for the outer periphery of the pattern plate, the outputs from the sensors (11) to (18) as the outputs for the product portion, the outputs from the sensors (1) to (18) as the outputs for the pattern plate overall, and the outputs from the sensors (1) to (18) as outputs indicating the disparity between the sensors (1) to (18). The outputs from the strength computation unit 2A are sent to a control device 2B and a display device 2C.

Next, the operations performed by the apparatus configured in this way will be explained. The state in FIG. 1 is the state in which molding sand S is loaded into the sand hopper 112 and an empty casting frame 120 has been conveyed into the carry-in/carry-out conveyor 119. The pattern carrier 106 is set on the pattern exchange apparatus 104 in a state such as to be lifted up by approximately 5 mm by a spring (not illustrated), so that there is a gap of approximately 5 mm with respect to the molding base 101. Next, as illustrated in FIG. 2, all of the segmented squeeze feet 113, 113 form recesses and protrusions complementing recesses and protrusions in the pattern plate 105 below. In this case, the leveling frame 108 is in a state of protrusion upwards from the parting plane of the pattern plate 105 due to the releasing/lifting cylinders 107, 107A. Furthermore, the pattern carrier 106 is pressed against the molding base 101 by means of the clamp apparatus (not illustrated).

Next, the sliding gate 109 is operated and the sand loading inlet 110 is closed. Thereafter, the filling frame cylinders 117, 117 are extended to lower the filling frame 116 so as to be pressed into tight contact with the upper surface of the casting frame 120, and the frame setting cylinders 102, 102 are retracted so that the casting frame 120 is pressed onto the leveling frame 108 that protrudes upwards around the outer perimeter of the pattern plate 105.

Next, low-pressure air is ejected from the multiple air ejection chambers into the sand hopper 112, thereby causing aeration so as to suspend and fluidize the molding sand S in the sand hopper 112, while low-pressure air is supplied from the air supply tube 111 to the sand hopper 112 through the on/off valve (not illustrated), thereby aerating and filling the molding space with the molding sand S through the sand loading nozzles 114, 114 by means of the low-pressure air.

Next, as illustrated in FIG. 3, the frame setting cylinders 102, 102 are further retracted, thereby lowering the raising/lowering support frame 103 and the elements supported thereon while the frame filling cylinders 117, 117 are retracted. A first squeeze that is a first compression step for the molding sand S is conducted until the entire lower surfaces of the segmented squeeze feet 113, 113 become flat, and at the same time, the sliding gate 109 is operated in reverse and the sand loading inlet 110 is opened.

Next, the apparatus is switched to a state for relieving the oil in the releasing/lifting cylinders 107, 107A, while the frame setting cylinders 102, 102 are retracted at a pressure higher than that in the first squeeze, thereby lowering the casting frame 120, the filling frame 116 and the squeeze feet 113, 113 in unison. The above constitutes a second squeeze that is a second compression step for the entire molding sand S. As a result thereof, the leveling frame 108 is lowered by the pins 124, 124A due to the retraction of the releasing/lifting cylinders 107, 107A, becoming substantially level with the parting plane of the pattern plate 105.

At this time, if the leveling frame 108 has not reached the lower end, then parting plane correction is performed. This is performed by extending the filling frame cylinders 117, 117 and lowering the filling frame 116 so as to press down the casting frame 120 until the leveling frame 108 reaches the lower end. As a result thereof, the lower surface of the casting frame 120 can always be made substantially flush with the lower surface of the casting mold.

In order to release a casting frame 120 that has been used for molding a casting mold in this way, the frame setting cylinders 102, 102 are raised at a low speed, and the releasing/lifting cylinders 107, 107A are raised at a speed that does not become slower than that of the frame setting cylinders 102, 102.

As the frame setting cylinders 102, 102 are raised, the squeeze feet 113, 113 and the filling frame 116 are also raised in unison. Simultaneously, the releasing/lifting cylinders 107, 107A are raised at a speed that does not become slower than that of the frame setting cylinders 102, 102. Thus, due to the extension of the releasing/lifting cylinders 107, 107A, the casting frame 120 is lifted by the leveling frame 108, pressed against the filling frame 116 and lifted in unison therewith, and is thereby separated from the pattern plate 105.

Thereafter, the filling frame 116 and the segmented squeeze feet 113, 113 are raised in unison, and during this time, the casting frame 120 that has been used for molding the casting mold is picked up by the carry-in/carry-out conveyor 119, and is completely separated from the pattern plate 105, while the sand hopper 112 is replenished with molding sand.

Next, the casting frame 120 that has been used for molding the casting mold is carried out by the carry-in/carry-out conveyor 119, and an empty casting frame 120 is carried in while the pattern exchange apparatus 104 is rotated by 180° to replace the pattern plate 105 with the pattern plate 105A. Then, the above operations are repeatedly performed.

The strength computation unit 2A, during the above-described operation of the mold molding apparatus 100, converts the outputs from the sensors (1) to (18) to casting strengths and supplies the results thereof to the control apparatus 2B. From this strength computation unit 2A, the outputs from the sensors (1) to (10) are used to compute the strength A along the outer periphery of the casting mold, the outputs from the sensors (11) to (18) are used to compute the strength B of the product portion of the casting mold, the outputs from the sensors (1) to (18) are used to compute the strength C of the casting mold overall, and the outputs from the sensors (1) to (18) are used to compute the disparity D in the strength at different parts of the casting mold.

The control apparatus 2B has first to sixth control units 202 to 207, and these control units 202 to 207 control the various parts of the mold molding apparatus based on the outputs from the molding sensors (1) to (18). The output values from the molding sensors (1) to (18) may be pressure values, or may be casting strength values obtained by converting the pressure values. Hereinafter, the case in which the output values from the molding sensors (1) to (18) are casting strength values obtained by converting pressure values will be described.

In this case, the mold molding apparatus 100 is trained that the causes due to which the strengths of the parts of a casting mold computed by using the outputs from the sensors (1) to (18) and the strength computation unit 2A are not within a defined range are the (a) aeration pressure, the (b) aeration time, the (c) board setting position, the (d)

squeeze pressure, the (e) use/non-use of segments/presets, the (f) segment/preset operation timing, and the (g) leveling frame operation timing. The outputs from the sensors (1) to (18) are used to perform feedback regarding the (a) aeration pressure, the (b) aeration time, the (c) board setting position, the (d) squeeze pressure, the (e) use/non-use of segments/presets, the (f) segment/preset operation timing, and the (g) leveling frame operation timing, so that the strengths necessary in the respective parts of the casting mold are obtained.

The board setting position refers to the squeeze feet setting position or the squeeze board setting position before the squeezing operation (before the sand is loaded). The thickness of the casting mold can be adjusted by adjusting the board setting position.

Regarding the method for applying feedback to each of the elements to be controlled, for example, in the case of the (a) aeration pressure, control is implemented so as to raise the aeration pressure and to raise the density of the molding sand S during aeration if the average value of the casting mold strength in the sensors is low, and so as to lower the aeration pressure and to lower the density of the molding sand S during aeration if the casting mold strength is high.

In the case of the (b) aeration time, control is implemented so as to make the aeration time longer and to increase the amount of sand that is loaded if the average value of the casting mold strength in the sensors is low, and so as to make the aeration time shorter and to decrease the amount of sand that is loaded if the casting mold strength is high.

In the case of the (c) board setting position, control is implemented so as to set the board setting position to be low and to lower the casting mold height if the average value of the casting mold strength in the sensors is low, and so as to set the board setting position to be high and to raise the casting mold height if the casting mold strength is high.

In the case of the (d) squeeze pressure, control is implemented so as to raise the squeeze pressure and to raise the sand compression ratio if the average value of the casting mold strength in the sensors is low, and so as to lower the squeeze pressure and to lower the sand compression ratio if the casting mold strength is high.

In the case of the (e) use/non-use of segments/presets, control is implemented so as to use segments/presets and to set the segments to reduce the disparity in the casting mold strength in the sensors if the disparity is large, and so as not to change the settings for the segments/presets if the disparity in the casting mold strength in the sensors is small.

In the case of the (f) segment/preset operation timing, control is implemented so as to delay the operation timing of the segments/presets and to sufficiently compress the molding sand S if the average value of the casting mold strength in the sensors is low, and so as to expedite the operation timing of the segments/presets and to reduce the compression of the molding sand S if the casting mold strength is high.

In the case of the (g) leveling frame operation timing, control is implemented so as to expedite the operation timing of the leveling frame and to sufficiently compress the molding sand S if the average value of the casting mold strength in the sensors is low, and so as to delay the operation timing of the leveling frame and to reduce the compression of the molding sand S if the casting mold strength is high.

The control methods for the control targets (a) to (g) indicated here are merely one example, and the exact opposite type of control may sometimes be performed, depending on the properties of the sand and the shape of the model. For example, regarding the (f) segment/preset operation timing, control may be implemented by delaying or expediting the operation timing in entirely opposite manners depending on whether a segmented system or a preset system is used, or whether the squeeze feet are being extended or retracted, and how these factors are combined. However, whatever the control target is, control is always implemented so that, if the casting mold strength is high, then it is lowered, and if it is low, then it is raised. Furthermore, if the disparity is large, then the disparity is reduced, and if the disparity is small, then the operations are not particularly changed from the previous cycle.

In this case, in accordance with the cause, i.e., the (a) aeration pressure, the (b) aeration time, the (c) board setting position, the (d) squeeze pressure, the (e) use/non-use of segments/presets, the (f) segment/preset operation timing, or the (g) leveling frame operation timing, either the case in which feedback is applied within a cycle during production or the case in which feedback is applied in the next cycle is selected.

Therefore, the measurement timing of the molding sensors may be during molding or after molding has been completed, and is selected by considering the time at which feedback is applied. However, if the measurements are made at the time the molding has been completed, then the feedback is not applied in real time in the cycle that is currently in progress.

In the above-described control, the measurement results for the strength A along the outer periphery of the casting mold are continually acquired and used to control the (g) leveling frame operation timing. The (g) leveling frame operation timing may be controlled in real time or in the next cycle, but it is particularly preferable for the control to be implemented in real time.

If the strength A along the outer periphery of the casting mold is insufficient, then an operation change instruction is issued for the (g) leveling frame operation timing regarding the casting mold that is being molded in real time, while monitoring the (d) squeeze pressure. Additionally, for the next cycle, the results from the response in the current cycle are incorporated, an operation change instruction is issued for the (g) leveling frame operation timing, and operation change instructions are issued for the (a) aeration pressure, the (b) aeration time, the (c) board setting position, the (d) squeeze pressure, the (e) use/non-use of segments/presets, and the (f) segment/preset operation timing associated with insufficient strength.

Additionally, in the above-described control, the measurement results for the strength B of the casting mold product portion are continually acquired and used to control the (a) aeration pressure, the (b) aeration time, and the (c) board setting position in the next cycle. Regarding the (d) squeeze pressure, the (e) use/non-use of segments/presets, the (f) segment/preset operation timing, and the (g) leveling frame operation timing, these are used for control in the cycle that is currently in progress or in the next cycle.

If the strength B in the casting mold product portion is insufficient, then operation change instructions are issued for the (d) squeeze pressure, the (e) use/non-use of segments/presets, and the (f) segment/preset operation timing for a casting mold that is being molded in real time. Additionally, for the next cycle, the results from the response in the current cycle are incorporated, operation change instructions are issued for the (d) squeeze pressure, the (e) use/non-use of segments/presets, and the (f) segment/preset operation timing, and operation change instructions are issued for the (a)

aeration pressure, the (b) aeration time, and the (c) board setting position associated with insufficient strength.

If the strength C in the entire casting mold is insufficient, then operation change instructions are issued for the (d) squeeze pressure, the (e) use/non-use of segments/presets, the (f) segment/preset operation timing, and the (g) leveling frame operation timing for a casting mold that is being molded in real time. Additionally, for the next cycle, the results from the response in the current cycle are incorporated, operation change instructions are issued for the (d) squeeze pressure, the (e) use/non-use of segments/presets, the (f) segment/preset operation timing, and the (g) leveling frame operation timing, and operation change instructions are issued for the (a) aeration pressure, the (b) aeration time, and the (c) board setting position associated with insufficient strength.

Additionally, not only is the control automatically implemented in the mold molding apparatus 100, but also, if the necessary strength is not obtained, then the cause thereof and countermeasures are displayed on the display device 2C, and the settings in the mold molding apparatus 100 are corrected by a worker.

A first control unit 202 controls the squeeze pressure when pressing the molding sand S. The control targets for the squeeze pressure are the frame setting cylinders 102, 102. A second control unit 203 and a third control unit 204 respectively control the aeration pressure and the aeration time for suspending and fluidizing the molding sand S when loading the molding sand S into the mold molding space. The control targets for changing the aeration pressure and the aeration time are generally electromagnetic valves (not illustrated). A fourth control unit 205 controls the squeeze feet setting position and the squeeze board setting position, which determine the casting mold thickness. The control targets determining the squeeze feet setting position or the squeeze board setting position are the filling frame cylinders 117, 117. A fifth control unit 206 controls the operation timing of the leveling frame 108, which largely affects the strength along the outer periphery of the casting mold. The control targets of the operation timing of the leveling frame 108 are the releasing/lifting cylinders 107, 107A. A sixth control unit 207 controls the operation of the squeeze feet 113, 113, which contribute to the disparity in the strength between different parts of the casting mold. The control target of the squeeze feet 113, 113 is a segment/preset cylinder 130.

Regarding the disparity D in the strength in the different parts of the casting mold, if the disparity is a defined value or larger, then there is a possibility that there is an abnormality in the mold molding apparatus such as clogging of the aeration nozzle or a filter, or clumping (hanging) of the sand in the molding sand hopper. Thus, a warning is displayed on the display device 2C and the parts are inspected.

In this case, the possibility of disparity D in the strength of the parts of the casting molds is defined, for example, in terms of the standard deviation or the like. Specifically, when the casting mold strengths at the locations computed by the strength computation unit 2A from the sensor outputs from the sensors (1) to (18) illustrated in FIG. 4 are represented by $X_1$ to $X_{18}$, the standard deviation s can be computed from the following expression and judged on the basis of whether or not it is equal to or less than a defined value that is predetermined.

$$s = \sqrt{\frac{1}{n}\sum_{i=1}^{n}(X_i - X_{avg})^2}$$ [Math. 1]

In this expression, n represents the number of samples (in this case, n=18) and $X_{avg}$ represents the average value of the casting mold strength $X_i$ (i=1 to 18) at all of the measurement points (1) to (18).

For managing the disparity D in the strength in the different parts of the casting mold, a predetermined first defined value (k1) and a second defined value (K2) smaller than the first defined value are used.

If the disparity D(s) in the strength in the different parts of the casting mold is greater than the first defined value (s>K1), then inspections for clogging of the aeration nozzle, hanging in the sand tank, and clogging of aeration filters are performed in the next cycle, as mentioned above.

If the disparity D(s) in the strength in the different parts of the casting mold is less than or equal to the first defined value (K1) and greater than or equal to the second defined value (K2≤s≤K1), then operation change instructions regarding the (e) use/non-use of segments/presets and the (f) segment/preset operation timing are issued for the casting mold being molded in real time. Additionally, for the next cycle, the results from the response in the current cycle are incorporated, operation change instructions are issued for the (e) use/non-use of segments/presets and the (f) segment/preset operation timing, and operation change instructions are issued for the (a) aeration pressure, the (b) aeration time, the (c) board setting position, the (d) squeeze pressure, and the (g) leveling frame operation timing associated with the malfunction.

Since the molding sand is kneaded in batches in prescribed amounts in a kneader, the properties of the sand in the same batch can be considered to be relatively uniform. Therefore, when the casting mold strength computed from the measurement values of the molding sensors are not within a defined range, the subsequent molding can be performed by using the set values after changes have been made in accordance with the above-described control, and these set values may be applied to a single batch of molding sand.

Additionally, in the above-described control, the order in which the feedback is applied to the parts being controlled, the order of correction of the settings in the mold molding apparatus by a worker, or the number of categories to be handled at once may be applied in any way, such as one at a time or two or more simultaneously.

Whether the sensors are mounted on a squeeze board or squeeze feet, or the sensors are mounted on a pattern plate, in both cases, the sensors that are used and the sensors that are not used by the strength computation unit 2A are selected in accordance with the shape of the product. This is because sensor outputs not associated with the product shape become noise when measuring the casting mold strength, and thus are removed. As the method for selection of the sensors, the sensors that can most accurately evaluate the casting mold strength of the product may be selected in accordance with a product shape read from a database or the like, so that, for example, sensors in the vicinity of the product portion are used and sensors that are far from the pattern are not used.

In this case, regarding the above-described series of control settings, when the preconditions by which control is uniformly fed back are changed, such as when the product is changed, the control values are initialized, and training and analysis are reattempted by data collection. The control values are stored in a database or the like, and when the product is changed or the like, if the control values are already stored, then they are employed as the initial values.

Figure 5:
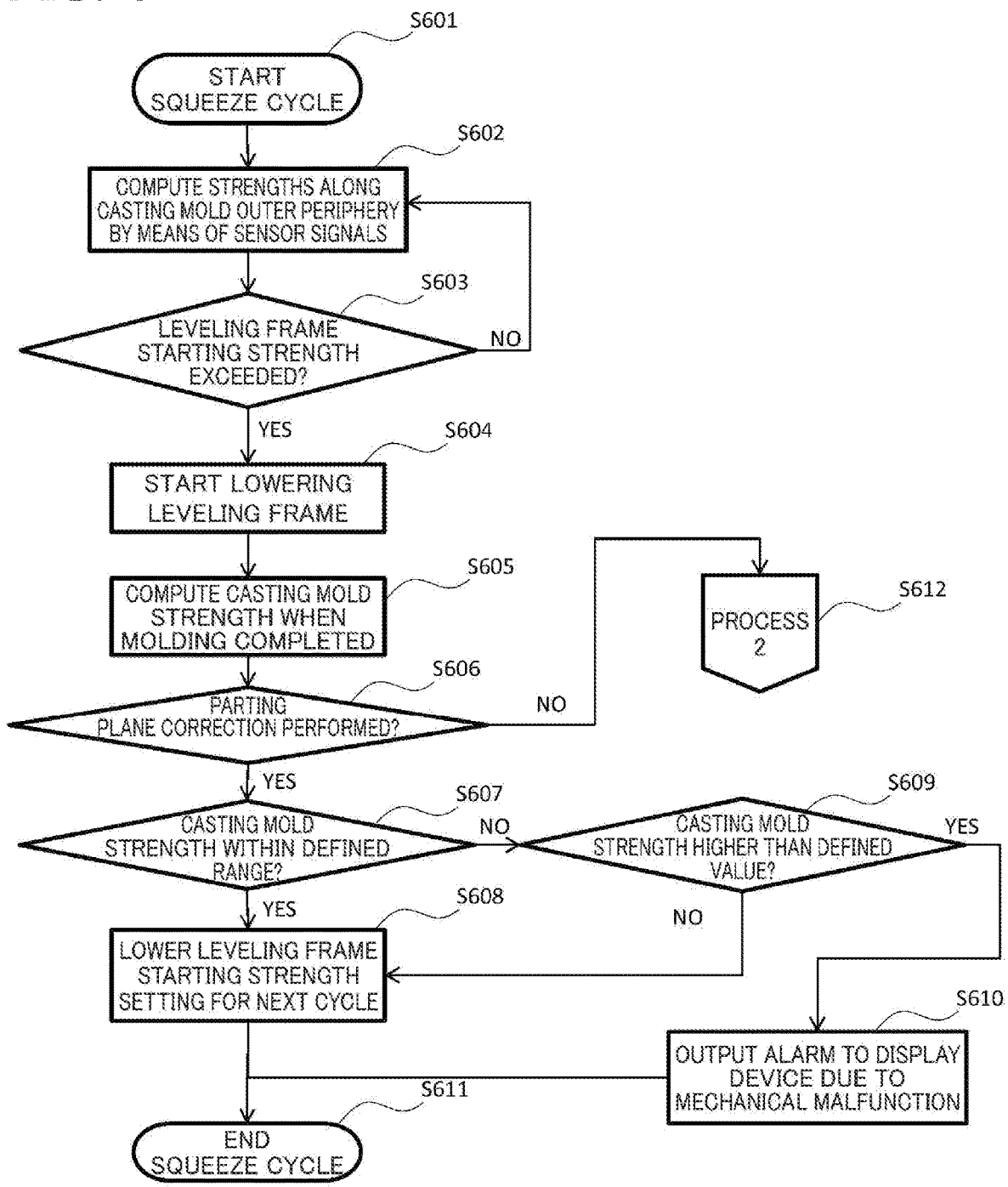
FIG. 5 is a flow chart for explaining a method for controlling the mold molding apparatus according to the above-mentioned embodiment.
Figure 6:
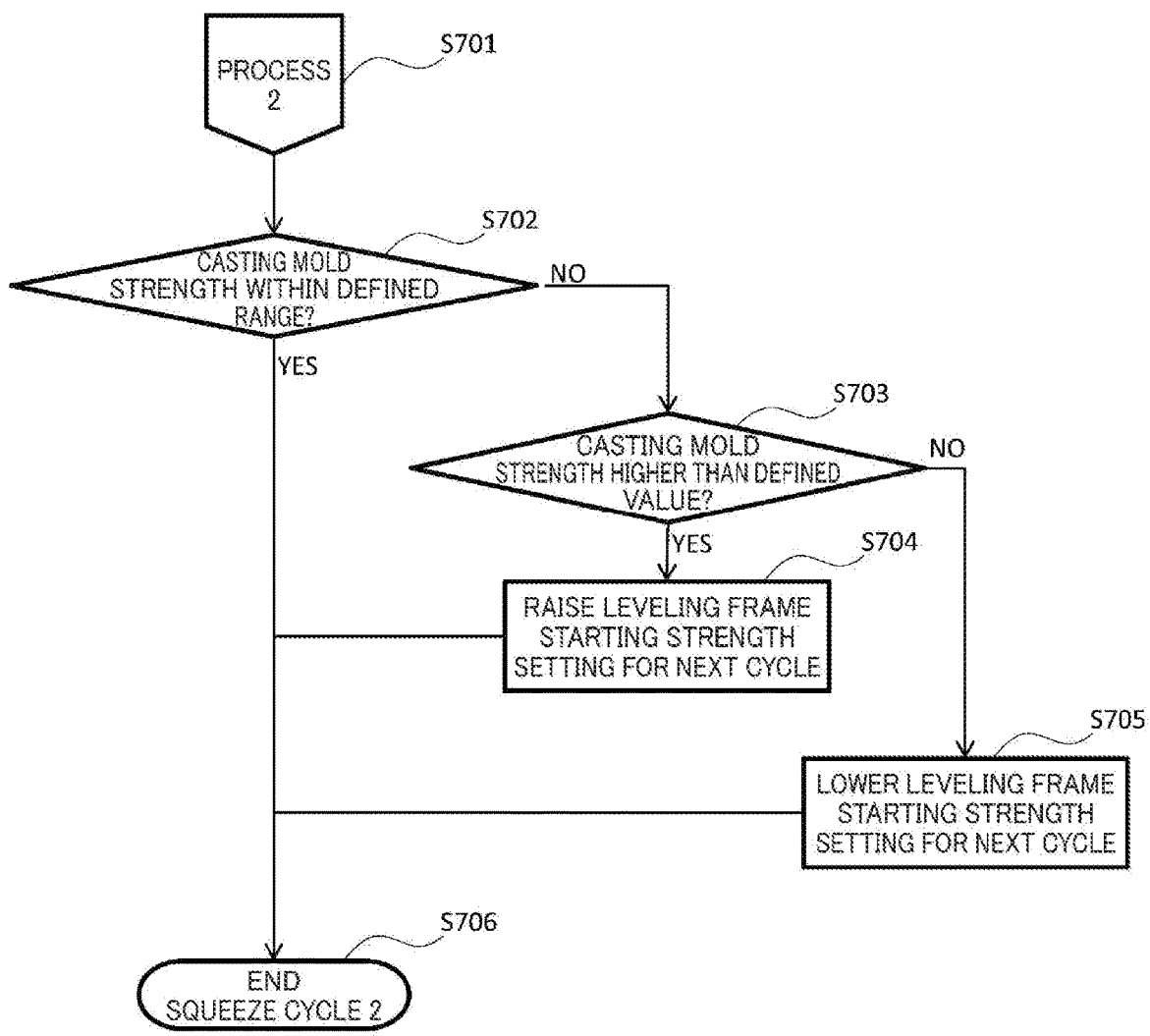
FIG. 6 is a flow chart for explaining the method for controlling the mold molding apparatus according to the above-mentioned embodiment.

FIG. 5 and FIG. 6 are flow charts indicating the control of the operation of the leveling frame during the squeeze step in the mold molding apparatus according to the above-described embodiment.

In these flow charts, the starting point is the state in which molding sand has been loaded into the mold molding space. First, in S601, the squeeze cycle is started. The strengths at different parts are computed by the strength computation unit 2A based on the signals from the sensors at the positions (1) to (10) indicated in FIG. 4, and the data is sent to the fifth control unit 206 in the control device 2B. (S602) The fifth control unit 206 monitors whether or not a newly determined leveling frame starting strength has been reached, and if it has not been reached, then the strength successively continues to be monitored. (S603) If the set strength has been reached, then the leveling frame starts being lowered, and the second squeeze commences. (S604) After the second squeeze has ended, the casting mold strength at the time of completion of the molding is computed. (S605) In this squeeze cycle, it is verified whether or not parting frame correction has been performed. (S606) If parting plane correction has been performed, then it is checked whether or not the casting mold strength at the time molding was completed is within a defined range. (S607) If the casting mold strength is within the defined range, then for the next squeeze cycle, the starting strength setting of the leveling frame is lowered from the conditions in which parting plane correction was performed (S608) and the starting (leveling frame operation timing) of the leveling frame is set to be earlier than that in the current cycle, and the squeeze cycle ends. (S611)

In S607, if the casting mold strength is not within the defined range, then it is checked whether the strength is too high or too low. (S609) If the strength is too low, then, as in the case in which the casting mold strength is within the defined range, for the next squeeze cycle, the starting strength setting of the leveling frame is lowered (S608) and the starting of the leveling frame is set to be earlier than that in the current cycle, and the squeeze cycle ends. (S611) If the strength is too high, then it is judged that a mechanical malfunction has occurred, a warning is issued to the display device 2C and the squeeze cycle ends. (S610)

In S606, if parting plane correction has not been performed, then the process is started from S701 in FIG. 6, and it is checked whether or not the casting mold strength is within the defined range. (S702) If the strength is within the defined range, then the squeeze cycle ends. (S706) If the strength is not within the defined range, then it is checked whether the strength is too high or too low. (S703) If the strength is too high, then for the next squeeze cycle, the starting strength setting of the leveling frame is raised and the starting timing of the leveling frame is delayed, and the squeeze cycle ends. (S704) If the strength is too low, then for the next squeeze cycle, the starting strength setting of the leveling frame is lowered and the starting timing of the leveling frame is set to be earlier, and the squeeze cycle ends. (S705)

The mold molding apparatus 100 according to the present embodiment, as described above, detects the pressure of the molding sand S at different parts of the casting mold, converts these detected outputs to strengths at the different parts of the casting mold, and produces casting molds by feeding back these strength outputs to the portions of the mold molding apparatus 100. Thus, the mold molding apparatus 100 is able to successively mold casting molds having the necessary casting mold strength.

Although an aeration system is used in the method of loading the sand in the present embodiment, the present invention is not limited thereto. For example, a gravitational dropping system may be used as the sand loading method. Additionally, although the mold molding apparatus in the present embodiment was, for example, a flask molding apparatus, the mold molding apparatus is not limited thereto. For example, a flaskless molding apparatus may be used.

Second Embodiment

Figure 7:
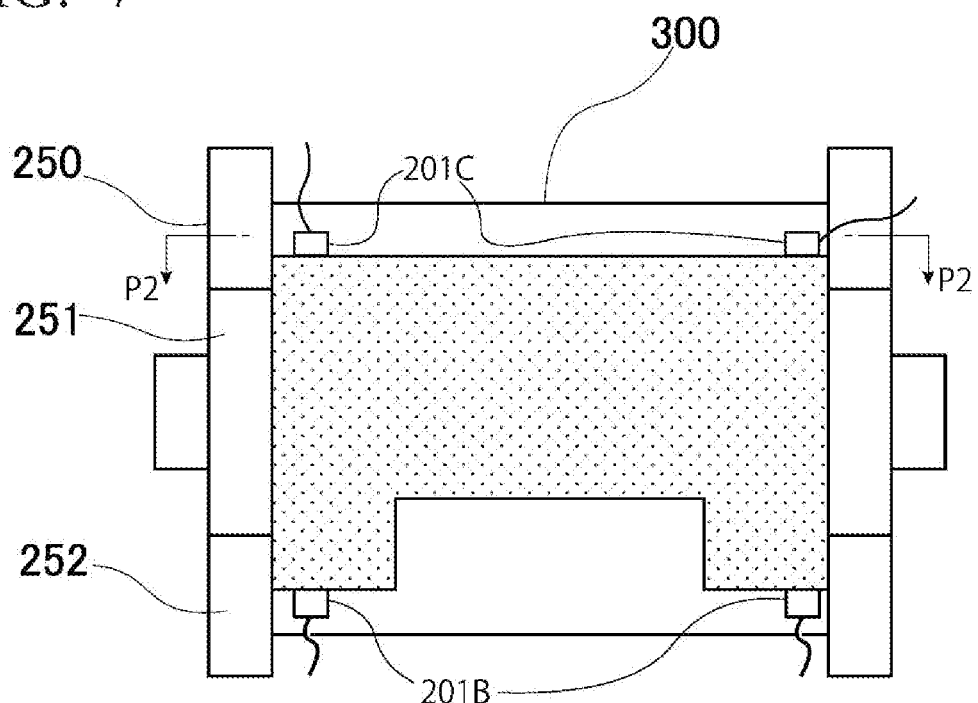
FIG. 7 is a vertical section view of a mold molding apparatus according to a second embodiment of the present invention.

FIG. 7 is a vertical section view of the mold molding apparatus according to a second embodiment of the present invention. In the drawing, reference number 250 denotes a filling frame, 251 denotes a casting frame, 252 denotes a leveling frame, and 300 denotes a squeeze board.

As illustrated in FIG. 7, the surfaces of the pattern plate 105 and the squeeze board 300 that contact the molding sand S are provided with molding sensors 201A, 201C for measuring the pressure of the molding sand S exerted on these surfaces. The sensors 201A, 201C illustrated in FIG. 7 are illustrated as schematic conceptual drawings, and the actual arrangements of the sensors are illustrated in FIG. 8. FIG. 8(a) illustrates the details of the molding sensors 201A provided in the pattern plate 105. FIG. 8(b) is a section view along the line P2-P2 in FIG. 7, and this drawing illustrates the details of the molding sensors 201C provided in the squeeze board 300.

The embodiment illustrated in this drawing differs from the first embodiment described above in that the squeeze board 300 is used as the element for performing the squeezing operation.

In this embodiment, aside from the fact that the squeezing operation is performed by a squeeze board 300, the casting molds are molded by operations similar to those in the first embodiment described above, and functions and effects similar to those in the above-described first embodiment are obtained.

(Modified Examples)

Hereinafter, modified examples of the above-described embodiments will be explained in connection with the mounting of the molding sensors. The modified examples below differ as to the number of molding sensors mounted on the pattern plate 105 and the squeeze feet 113, 113, . . . .

FIG. 9 illustrates the arrangement of the sensors in the case in which multiple molding sensors are mounted on the pattern plate 105 (FIG. 9(a)) and one molding sensor is mounted on the squeeze feet 113, 113, . . . (FIG. 9(b)).

FIG. 10 illustrates the arrangement of the sensors in the case in which one molding sensor is mounted on the pattern plate 105 (FIG. 10(a)) and multiple molding sensors are mounted on the squeeze feet 113, 113, . . . (FIG. 10(b)).

FIG. 11 illustrates the arrangement of the sensors in the case in which one molding sensor is mounted on the pattern plate 105 (FIG. 11(a)) and one molding sensor is mounted on the squeeze feet 113, 113, . . . (FIG. 11(b)).

When multiple molding sensors are mounted on the pattern plate 105 and molding sensors are not mounted on the squeeze feet 113, 113, . . . , the arrangement of the sensors on the pattern plate 105 becomes as illustrated in FIG. 9(a), and in this case, no sensors are mounted on the squeeze feet 113, 113, . . . (not illustrated).

When one molding sensor is mounted on the pattern plate 105 and molding sensors are not mounted on the squeeze feet 113, 113, . . . , the arrangement of the sensor on the pattern plate 105 becomes as illustrated in FIG. 10(a), and in this case, no sensors are mounted on the squeeze feet 113, 113, . . . (not illustrated).

When molding sensors are not mounted on the pattern plate 105 and multiple molding sensors are mounted on the squeeze feet 113, 113, . . . , the arrangement of the sensors on the squeeze feet 113, 113, . . . becomes as illustrated in FIG. 10(b), and in this case, no sensors are mounted on the pattern plate 105 (not illustrated).

When molding sensors are not mounted on the pattern plate 105 and one molding sensor is mounted on the squeeze feet 113, 113, . . . , the arrangement of the sensor on the squeeze feet 113, 113, . . . becomes as illustrated in FIG. 9(b), and in this case, no sensors are mounted on the pattern plate 105 (not illustrated).

The modified examples below differ as to the number of molding sensors mounted on the pattern plate 105 and the squeeze board 300.

FIG. 12 illustrates the arrangement of the sensors in the case in which multiple molding sensors are mounted on the pattern plate 105 (FIG. 12(a)) and one molding sensor is mounted on the squeeze board 300 (FIG. 12(b)).

FIG. 13 illustrates the arrangement of the sensors in the case in which one molding sensor is mounted on the pattern plate 105 (FIG. 13(a)) and multiple molding sensors are mounted on the squeeze board 300 (FIG. 13(b)).

FIG. 14 illustrates the arrangement of the sensors in the case in which one molding sensor is mounted on the pattern plate 105 (FIG. 14(a)) and one molding sensor is mounted on the squeeze board 300 (FIG. 14(b)).

When multiple molding sensors are mounted on the pattern plate 105 and molding sensors are not mounted on the squeeze board 300, the arrangement of the sensors on the pattern plate 105 becomes as illustrated in FIG. 12(a), and in this case, no sensors are mounted on the squeeze board 300 (not illustrated).

When one molding sensor is mounted on the pattern plate 105 and molding sensors are not mounted on the squeeze board 300, the arrangement of the sensor on the pattern plate 105 becomes as illustrated in FIG. 13(a), and in this case, no sensors are mounted on the squeeze board 300 (not illustrated).

When molding sensors are not mounted on the pattern plate 105 and multiple molding sensors are mounted on the squeeze board 300, the arrangement of the sensors on the squeeze board 300 becomes as illustrated in FIG. 13(b), and in this case, no sensors are mounted on the pattern plate 105 (not illustrated).

When molding sensors are not mounted on the pattern plate 105 and one molding sensor is mounted on the squeeze board 300, the arrangement of the sensor on the squeeze board 300 becomes as illustrated in FIG. 12(b), and in this case, no sensors are mounted on the pattern plate 105 (not illustrated).

The above-described variations in the mounting of the molding sensors on the pattern plate 105 and the squeeze feet 113, 113, . . . or the squeeze board 300 can be selected as appropriate by considering factors such as the control precision and the cost of the mold molding apparatus, based on the shape of the casting mold to be molded.

REFERENCE SIGNS LIST 105, 105A Pattern plate
113 Squeeze foot
201A, 201B, 201C Molding sensor
2A Strength computation unit
2B Control device
2C Display device
300 Squeeze board
202 to 207 First to sixth control units
108, 108A, 252 Leveling frame
S Molding sand

The invention claimed is:

1. A mold molding apparatus comprising:
at least one molding sensor that measures a pressure of molding sand exerted (i) on a surface of one or both of a pattern plate and a squeeze feet, or (ii) on a surface of one or both of the pattern plate and a squeeze board, the at least one molding sensor being disposed on the surface of one or both of the pattern plate and the squeeze feet, or on the surface of one or both of the pattern plate and the squeeze board, the molding sand coming into contact with the respective surface;
a strength computation unit that computes a casting mold strength based on an output from the at least one molding sensor; and
a control device that controls operation of the mold molding apparatus based on the casting mold strength computed by the strength computation unit.

2. The mold molding apparatus according to claim 1, wherein a plurality of molding sensors, including the at least one molding sensor, are provided on the surface of one or both of the pattern plate and the squeeze feet, or on the surface of one or both of the pattern plate and the squeeze board.

3. The mold molding apparatus according to claim 2, wherein the at least one molding sensor is selected in accordance with a shape of a product portion of the pattern plate.

4. The mold molding apparatus according to claim 2, further comprising a display device that, when the outputs from the plurality of molding sensors, including the at least one molding sensor, have a disparity of a predetermined value or larger, displays a warning regarding clogging of an aeration nozzle, clogging of an aeration filter, or clumping of sand in a molding sand hopper, and when the disparity is lower than the predetermined value, the control device continues to control operation of the mold molding apparatus.

5. The mold molding apparatus according to claim 1, wherein the control device includes a first control unit that controls a squeeze pressure based on the casting mold strength.

6. The mold molding apparatus according to claim 5, wherein the control device includes a second control unit that controls an aeration pressure based on the casting mold strength.

7. The mold molding apparatus according to claim 6, wherein the control device includes a third control unit that controls an aeration time based on the casting mold strength.

8. The mold molding apparatus according to claim 7, wherein the control device includes a fourth control unit that controls a setting position of the squeeze feet or the squeeze board based on the casting mold strength.

9. The mold molding apparatus according to claim 8, wherein the control device includes a fifth control unit that controls a leveling frame based on the casting mold strength.

10. The mold molding apparatus according to claim 9, wherein the control device includes a sixth control unit that controls the squeeze feet based on the casting mold strength.

11. The mold molding apparatus according to claim 1, further comprising a display device that, when the output from the at least one molding sensor is not at least a necessary output value, displays a cause due to which the necessary output is not obtained and a countermeasure therefor.

12. A method for controlling a mold molding apparatus, the method comprising:
   measuring a pressure of molding sand exerted on a surface of one or both of a pattern plate and a squeeze feet, or on a surface of one or both of the pattern plate and a squeeze board;
   computing a casting mold strength based on the measured pressure; and
   controlling operation of the mold molding apparatus based on the computed casting mold strength.

13. The method for controlling the mold molding apparatus according to claim 12, further comprising measuring the pressure of molding sand in multiple places on the surface of one or both of the pattern plate and the squeeze feet, or on the surface of one or both of the pattern plate and the squeeze board.

14. The method for controlling the mold molding apparatus according to claim 13, wherein measuring positions of the pressure of molding sand are selected in accordance with a shape of a product portion of the pattern plate.

15. The method for controlling the mold molding apparatus according to claim 13, further comprising displaying a warning regarding clogging of an aeration nozzle, clogging of an aeration filter, or clumping of sand in a molding sand hopper, when measured pressures at the multiple places on the surface of one or both of the pattern plate and the squeeze feet, or on the surface of one or both of the pattern plate and the squeeze board have a disparity of a predetermined value or larger, and when the disparity is smaller than the predetermined value, the method continues to control the mold molding apparatus.

16. The method for controlling the mold molding apparatus according to claim 12, further comprising controlling a squeeze pressure based on the casting mold strength.

17. The method for controlling the mold molding apparatus according to claim 12, further comprising controlling an aeration pressure based on the casting mold strength.

18. The method for controlling the mold molding apparatus according to claim 12, further comprising controlling an aeration time based on the casting mold strength.

19. The method for controlling the mold molding apparatus according to claim 12, further comprising controlling a setting position of the squeeze feet or the squeeze board based on the casting mold strength.

20. The method for controlling the mold molding apparatus according to claim 12, further comprising controlling a leveling frame based on the casting mold strength.

21. The method for controlling the mold molding apparatus according to claim 12, further comprising controlling the squeeze feet based on the casting mold strength.

22. The method for controlling the mold molding apparatus according to claim 12, further comprising displaying a cause due to which a necessary pressure is not obtained and a countermeasure therefor, when the measured pressure is not at least the necessary pressure value.

* * * * *